US010734884B2

(12) United States Patent
Sadilek et al.

(10) Patent No.: US 10,734,884 B2
(45) Date of Patent: Aug. 4, 2020

(54) MODULAR MULTILEVEL CONVERTER HARMONIC INJECTION SYSTEMS AND METHODS

(71) Applicant: GENERAL ELECTRIC COMPANY, Schenectady, NY (US)

(72) Inventors: Tomas Sadilek, Schenectady, NY (US); Di Zhang, Niskayuna, NY (US); Zhi Zhou, Selkirk, NY (US); Dong Dong, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/762,130

(22) PCT Filed: Oct. 2, 2015

(86) PCT No.: PCT/US2015/053774
§ 371 (c)(1),
(2) Date: Mar. 22, 2018

(87) PCT Pub. No.: WO2017/058253
PCT Pub. Date: Apr. 6, 2017

(65) Prior Publication Data
US 2018/0269775 A1    Sep. 20, 2018

(51) Int. Cl.
*H02M 1/12* (2006.01)
*H02M 7/483* (2007.01)
*H02J 3/01* (2006.01)

(52) U.S. Cl.
CPC .............. *H02M 1/12* (2013.01); *H02J 3/01* (2013.01); *H02M 7/483* (2013.01); *H02M 2007/4835* (2013.01); *Y02E 40/40* (2013.01)

(58) Field of Classification Search
CPC ............ H02M 1/12; H02M 7/483; H02M 2007/4835; H02J 3/01; Y02E 40/40
See application file for complete search history.

(56) References Cited

U.S. PATENT DOCUMENTS

| 5,499,178 A | 3/1996 | Mohan |
| 6,058,031 A | 5/2000 | Lyons et al. |

(Continued)

FOREIGN PATENT DOCUMENTS

| CN | 102857123 A | 1/2013 |
| CN | 104300554 A | 1/2015 |

(Continued)

OTHER PUBLICATIONS

Engel, S. P., et al., "Control of the Modular Multi-Level Converter for Minimized Cell Capacitance," Proceedings of the 2011—14th European Conference on Power Electronics and Applications (EPE), pp. 1-10 (Aug. 30, 2011-Sep. 1, 2011).

(Continued)

*Primary Examiner* — Adolf D Berhane
*Assistant Examiner* — Kevin H Sprenger
(74) *Attorney, Agent, or Firm* — Wood IP LLC

(57) ABSTRACT

Systems and methods to improve operation of a modular multilevel converter. Some embodiments include a first upper arm with a first active power link module, which facilitates producing a first portion of a first alternating current electrical power at a base frequency and injecting a first even-order current harmonic of the base frequency in the first upper arm, and a first lower arm with a second active power link module, which facilitates producing a second portion of the first alternating current, in which the first portion of the first alternating current and the second portion of the alternating current are combined to facilitate outputting the first alternating current electrical power at a first alternating current terminal, and injecting the first even-order current harmonic in the first lower arm, in which magnitude of the first even-order current harmonic is zero at the first alternating current terminal.

19 Claims, 14 Drawing Sheets

(56) References Cited

U.S. PATENT DOCUMENTS

| | | | |
|---|---|---|---|
| 8,879,291 B2 | 11/2014 | Trainer et al. | |
| 2010/0085789 A1* | 4/2010 | Ulrich | H02M 7/483 363/132 |
| 2013/0329471 A1 | 12/2013 | Escobar et al. | |
| 2015/0288287 A1* | 10/2015 | Madawala | H02M 1/12 363/21.01 |
| 2017/0054294 A1* | 2/2017 | Lyu | H02J 3/01 |
| 2018/0019699 A1* | 1/2018 | Zaimeddine | H02P 21/24 |

FOREIGN PATENT DOCUMENTS

| | | |
|---|---|---|
| JP | H07-264778 A | 10/1995 |
| WO | 2013/137749 A1 | 9/2013 |
| WO | 2014/046555 A1 | 3/2014 |
| WO | 2015/108614 A1 | 12/2015 |

OTHER PUBLICATIONS

Kimura, N., et al.,"Reduction of Converter Rating for New Induction Generator System by 3rd Harmonic Injection," 15th European Conference on Power Electronics and Applications (EPE), pp. 1-8 (Sep. 2-6, 2013).

Picas, R., et al.,"Optimal injection of Harmonics in Circulating Currents of Modular Multilevel Converters for Capacitor Voltage Ripple Minimization", IEEE ECCE Asia Downunder (ECCE Asia), pp. 318-324 (Jun. 3-6, 2013).

International Search Report and Written Opinion issued in connection with corresponding PCT Application No. PCT/US2015/053774 dated Jun. 23, 2016.

International Preliminary Report on Patentability issued in connection with corresponding PCT Application No. PCT/US2015/053774 dated Jan. 8, 2018.

* cited by examiner

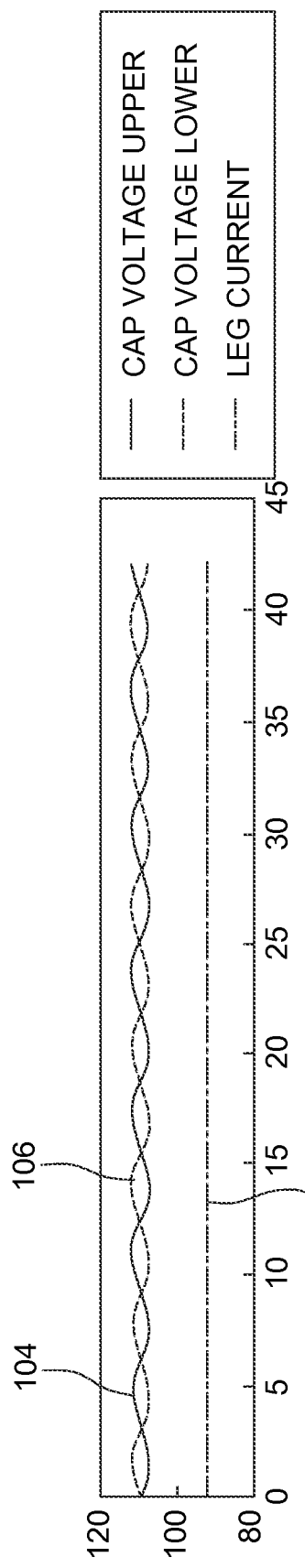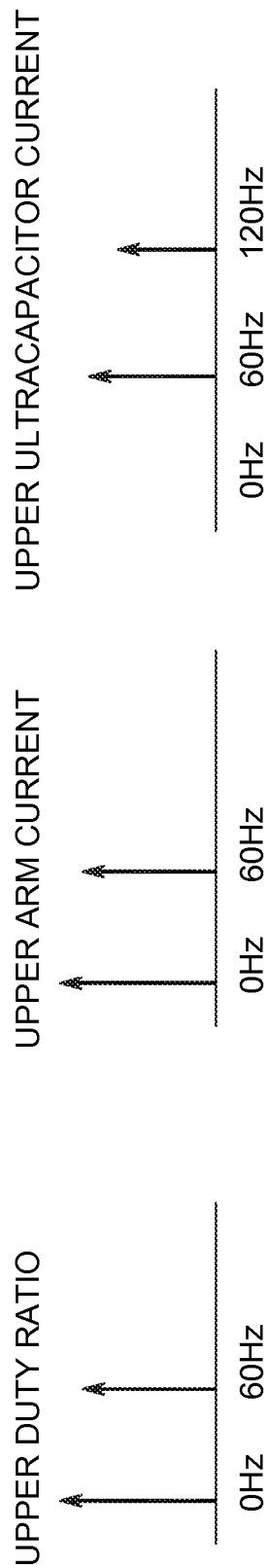

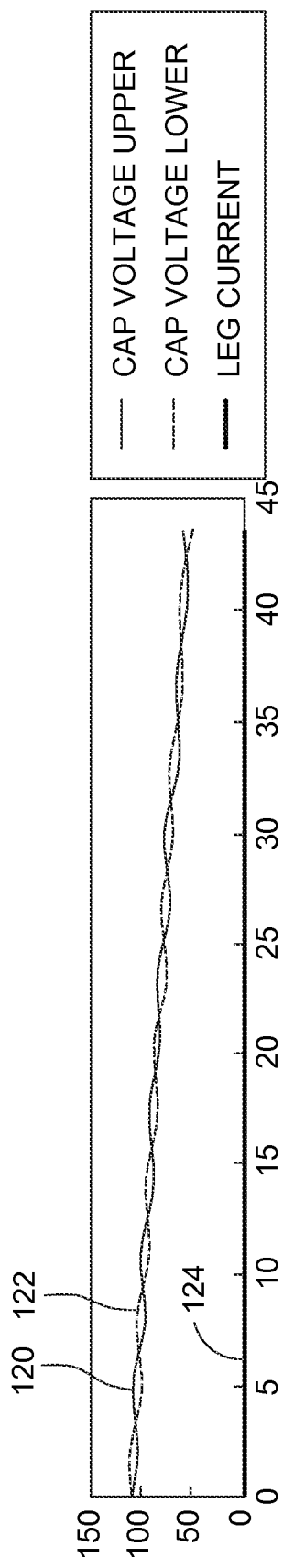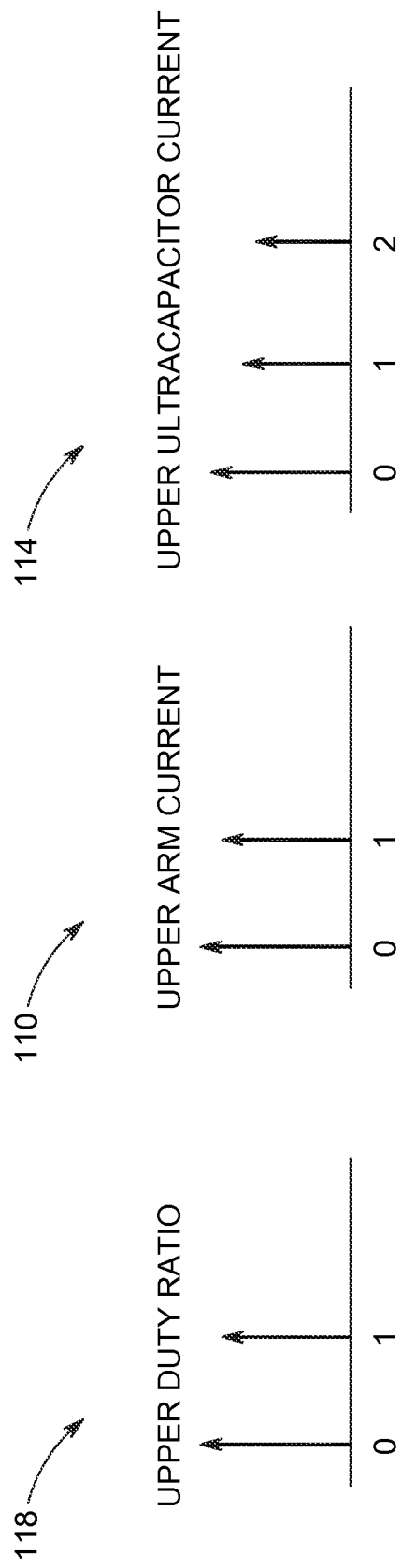

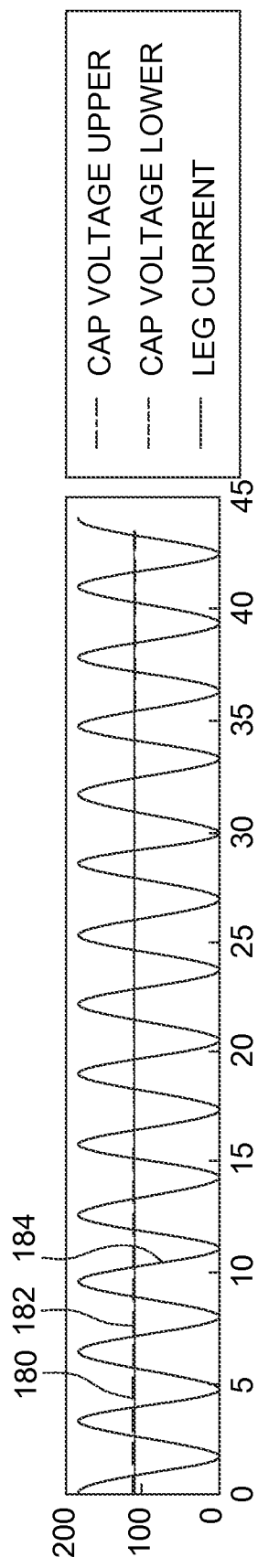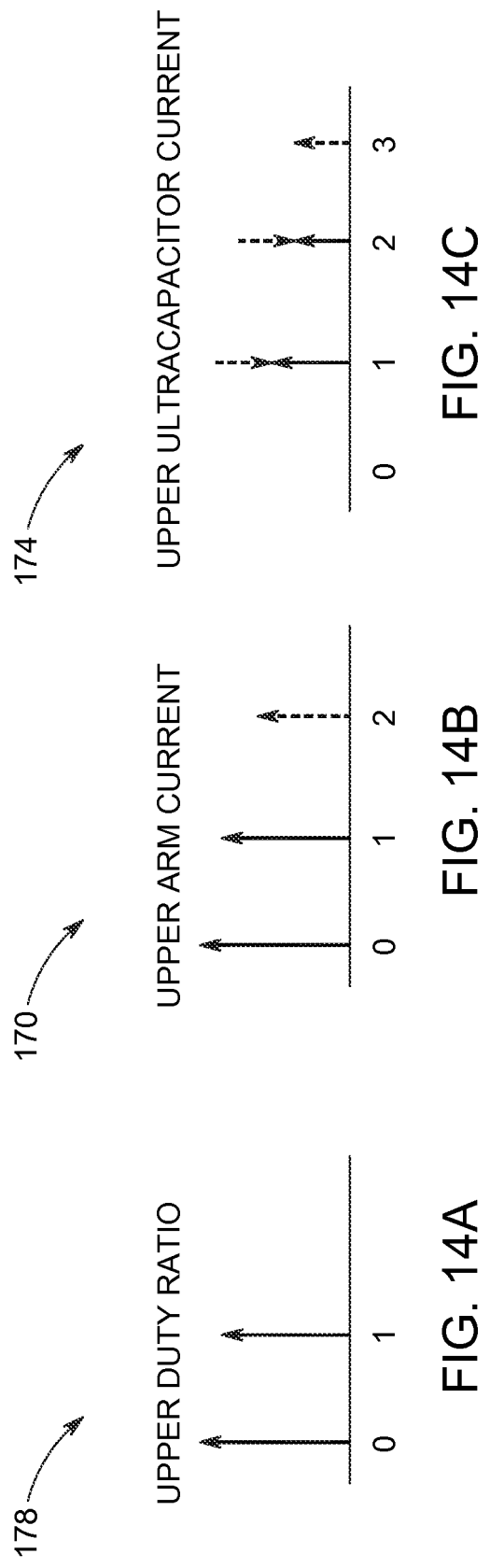

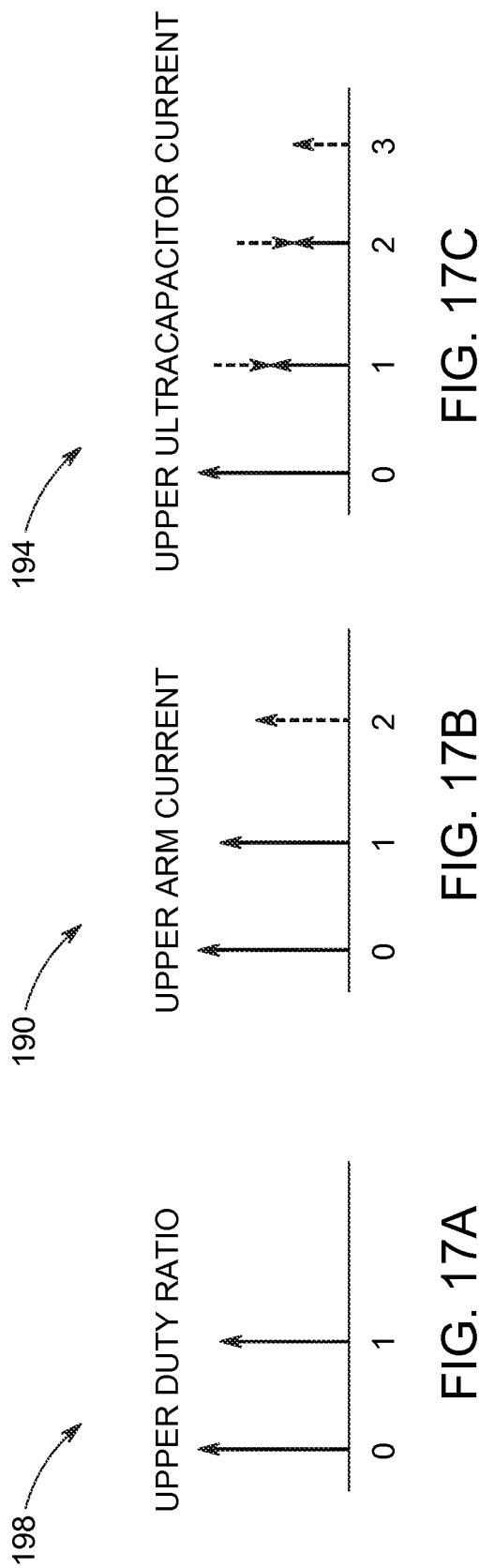

US 10,734,884 B2

MODULAR MULTILEVEL CONVERTER HARMONIC INJECTION SYSTEMS AND METHODS

STATEMENT REGARDING FEDERALLY SPONSORED RESEARCH & DEVELOPMENT

This invention was made with Government support under contract number N00014-14-C-0103 awarded by the Office of Naval Research. The Government has certain rights in the invention.

BACKGROUND

The present disclosure generally relates to modular multilevel converters (MMCs) and, more particularly, to improving energy storage capabilities of modular multilevel converters.

Generally, a modular multilevel converter may be used in voltage systems, such as a high voltage direct current (HVDC) system or a high voltage alternative current (HVAC) system. More specifically, the modular multilevel converter may be employed to convert between alternating current (AC) electrical power and direct current (DC) electrical power. For example, in an HVDC system, the modular multilevel converter may convert high voltage AC electrical power received from an AC grid to high voltage DC electrical power supplied to a DC grid or storage component (e.g., battery). Additionally, the modular multilevel converter may convert high voltage DC electrical power received from the DC grid or storage component to high voltage AC electrical power supplied to the AC grid.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a modular multilevel converter includes a first upper arm with a first active power link module, in which the first active power link module selectively connects and disconnects a first ultracapacitor to the first upper arm to facilitate producing a first portion of a first alternating current electrical power at a base frequency and injecting a first even-order current harmonic of the base frequency in the first upper arm. The modular multilevel converter includes a first lower arm with a second active power link module, in which the second active power link module selectively connects and disconnects a second ultracapacitor to the first lower arm to facilitate producing a second portion of the first alternating current, in which the first portion of the first alternating current and the second portion of the alternating current are combined to facilitate outputting the first alternating current electrical power at a first alternating current terminal and injecting the first even-order current harmonic in the first lower arm, wherein magnitude of the first even-order current harmonic is zero at the first alternating current terminal, in which the first even-order current harmonic facilitates reducing root-mean-square current flowing in the first ultracapacitor and root-mean square of current flowing the second ultracapacitor when the modular multilevel converter is in operation.

In another embodiment, a power system includes a modular multilevel converter electrically coupled between a direct current side and an alternating current side, in which the modular multilevel converter outputs alternating current electrical power at a base frequency to the alternating current side. The power system also includes a controller communicatively coupled to the modular multilevel converter, in which the controller instructs the modular multilevel converter to selectively connect and disconnect one or more storage components to produce the alternating current electrical power; determines operational parameters of the modular multilevel converter; determines harmonic injection parameters based at least in part on the operational parameters; and instruct the modular multilevel converter to inject one or more even order harmonics of the base frequency into legs of the multilevel converter based at least in part on the harmonic injection parameters such that the one or more even order harmonics reduce root-mean square of current conducted by the one or more storage components.

In another embodiment, a tangible, non-transitory, computer-readable medium that stores instructions executable by a processor of a controller. The instructions include instructions to instruct, using the processor, a modular multilevel converter to output alternating current electrical power at a base frequency by selectively connecting and disconnecting a plurality of storage components that store electrical energy to legs of the modular multilevel converter; determine, using the processor, operational parameters of the modular multilevel converter based at least in part on sensor measurements and control signals transmitted to the modular multilevel converter from the controller; determine, using the processor, harmonic injection parameters based at least in part on the operational parameters and calibration data, in which the calibration data describes a relationship between the operational parameters and a set of parameters with which to inject an even order harmonic of the base frequency in legs of the modular multilevel converter to reduce root-mean square of current conducted by each of the plurality of storage components; and instruct, using the processor, the modular multilevel converter to inject the even order harmonic based at least in part on the harmonic injection parameters.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5D is a plot of branch current, upper ultracapacitor voltage and lower ultracapacitor voltage when operating in the steady-state inverter mode, in accordance with an embodiment;

FIG. 6A is a plot of frequency components of the upper ultracapacitor duty ratio of FIG. 5C, in accordance with an embodiment;

FIG. 6B is a plot of frequency components of the upper arm current of FIG. 5A, in accordance with an embodiment;

FIG. 6C is a plot of frequency component of the upper ultracapacitor current of FIG. 5B, in accordance with an embodiment;

FIG. 7D is a plot of branch current and upper storage component voltage and lower storage component voltage when operating in the transient inverter mode, in accordance with an embodiment;

FIG. 8A is a plot of frequency components of the duty ratio of FIG. 7C, in accordance with an embodiment;

FIG. 8B is a plot of frequency components of the upper arm current of FIG. 7A, in accordance with an embodiment;

FIG. 8C is a plot of frequency component of the upper storage component current of FIG. 7B, in accordance with an embodiment;

FIG. 13D is a plot of branch current and upper storage component voltage and lower storage component voltage when operating in the steady-state inverter mode with harmonic injection, in accordance with an embodiment;

FIG. 14A is a plot of frequency components of the duty ratio of FIG. 13C, in accordance with an embodiment;

FIG. 14B is a plot of frequency components of the upper arm current of FIG. 13A, in accordance with an embodiment;

FIG. 14C is a plot of frequency component of the upper storage component current of FIG. 13B, in accordance with an embodiment;

FIG. 17A is a plot of frequency components of the duty ratio of FIG. 16C, in accordance with an embodiment;

FIG. 17B is a plot of frequency components of the upper arm current of FIG. 16A, in accordance with an embodiment;

FIG. 17C is a plot of frequency component of the upper storage component current of FIG. 16B, in accordance with an embodiment.

DETAILED DESCRIPTION

Figure 1:
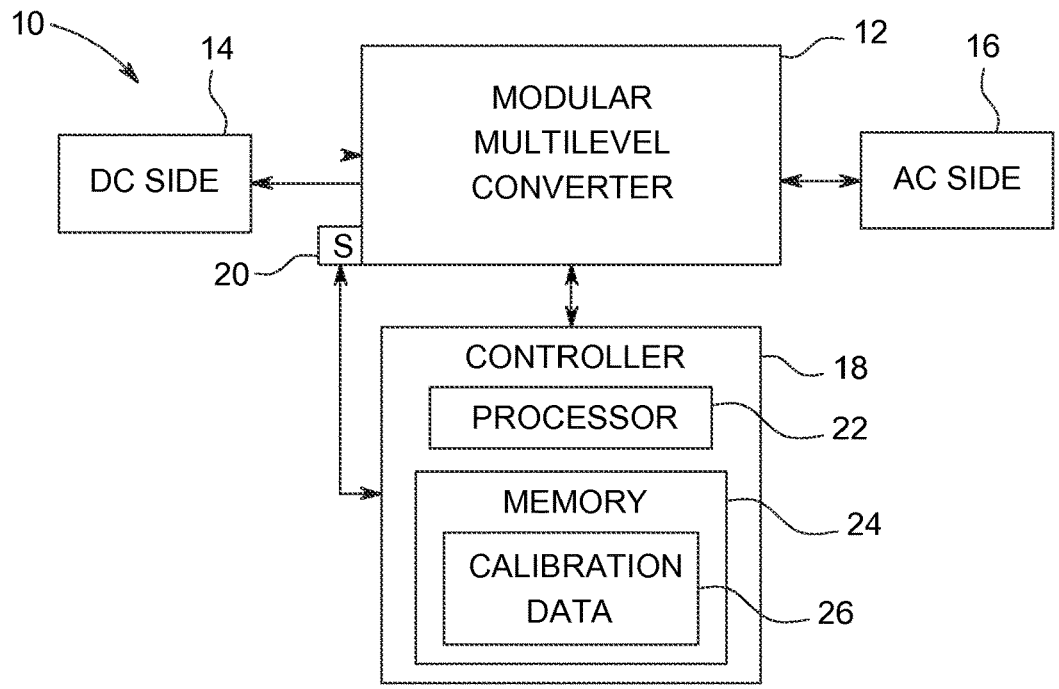
FIG. 1 is a block diagram of a voltage system including a modular multilevel converter, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Generally, modular multilevel converters (MMCs) may be employed to convert alternating current (AC) electrical power into direct current (DC) electrical power and/or to converter DC electrical power into AC electrical power.

Accordingly, modular multilevel converters are often used in voltage systems, for example, to facilitate transmission of high voltage electrical power from a generator to a load in a high voltage direct current (HVDC) system, a high voltage alternating current (HVAC) system, medium-voltage direct current (MVDC) system, a medium-voltage alternating current (MVDC) system, or any combination thereof.

For example, in an HVDC system, an AC power generator (e.g., a wind turbine, a gas turbine, or the like) may generate high voltage AC electrical power, which may be transmitted via a first AC electrical grid. A first modular multilevel converter may then convert the high voltage AC electrical power to high voltage DC electrical power. In some embodiments, the high voltage DC electrical power may be stored in a battery for subsequent use. In other embodiments, the high voltage DC electrical power may be provided to a DC electrical grid for transmission. In such embodiments, a second modular multilevel converter may then convert the high voltage DC electrical power back into high voltage AC electrical power, which may be transmitted to a load via a second AC electrical grid. In other words, the modular multilevel converters may facilitate transmission of electrical power by converting AC electrical power to DC electrical power and/or converting DC electrical power to AC electrical power.

To facilitate such conversions, a modular multilevel converter may include multiple legs coupled between an AC side and a DC side. For example, when one phase AC electrical power is input/output, a modular multilevel converter may include two legs that are coupled between the AC side and the DC side. Additionally, when three phase AC electrical power in input/output, a modular multilevel converter may include three legs that are coupled between the AC side and the DC side.

Each leg may include multiple storage components that are selectively connected and disconnected. For example, when AC electrical power is input, the storage components on each leg may be selectively connected to control charging of the storage components. On the other hand, when AC electrical power is output, the storage components on each leg may be selectively connected to control magnitude of the AC electrical power. Accordingly, various types of storage components may be suitable for use in a modular multilevel converter. For example, in some embodiments, a modular multilevel converter may employ capacitors as storage components. In other embodiments, a modular multilevel converter may employ ultracapacitors as storage components.

Generally, tradeoffs may exist between differing types of storage components used a modular multilevel converter. For example, ultracapacitors may provide increased storage capabilities compared to standard capacitors. In fact, in some embodiments, ultracapacitors may enable a modular multilevel converter to output AC electrical power for extended durations without drawing electrical power from the DC side. In this manner, a modular multilevel converter may serve as a buffer to reduce harmonic current drawn from DC side by temporarily bypassing the DC side. However, ultracapacitors may also be less tolerant of heavy current below the 1 kHz range than standard capacitors. More specifically, heavy current may cause increased heating in an ultracapacitor, which may increase temperature and decrease lifespan.

Thus, as will be described in more detail below, the present disclosure describes techniques to facilitate use of current sensitive storage components (e.g., ultracapacitors) in a modular multilevel converter by facilitating reduction of root-mean-square (RMS) current conducted by the storage components. In some embodiments, the RMS current may be reduced by injecting one or more even order harmonics (e.g., even multiples of output AC electrical power frequency) into the modular multilevel converter.

More specifically, as described above, a modular multilevel converter may include multiple phase legs electrically coupled between an AC side and a DC side. Each phase leg may include an upper arm electrically coupled between a positive DC terminal and an AC terminal of the modular multilevel converter. Additionally, each phase leg may include a lower arm electrically coupled between a negative DC terminal and the AC terminal of the modular multilevel converter.

Furthermore, each arm may include one or more storage component modules (e.g., active power link modules) that each selectively connects and disconnects a storage component (e.g., ultracapacitor) to control output of AC electrical power to its corresponding AC terminal. For example, when connected, an ultracapacitor may output electrical power to the AC terminal. On the other hand, when disconnected, the ultracapacitor may cease outputting electrical power to the AC terminal. As such, the number of storage components connected on each arm may control magnitude, phase, and/or frequency of AC electrical power supplied from the modular multilevel converter.

In other words, when connected, current from the arm may flow into the storage component to charge the storage component and out of the storage component to facilitate generating the AC electrical power. However, current flow in the storage component may be directly related to temperature of the storage component. For example, higher RMS current flow in an ultracapacitor (e.g., storage component) may increase its temperature, thereby decreasing life span of the ultracapacitor. On the other hand, lower RMS current flow in the ultracapacitor may decrease its temperature, thereby increasing life span of the ultracapacitor.

Accordingly, to reduce RMS current conducted by the storage components, the modular multilevel converter may inject (e.g., introduce) one or more harmonics. In some embodiments, the harmonics may be even multiples of the output AC electrical frequency (e.g., base frequency). For example, when the base frequency is 60 Hz, the modular multilevel converter may inject second order harmonics at 120 Hz in each phase leg.

In some embodiments, the parameters (e.g., angle and magnitude) of the one or more harmonics may be determined such that the range of storage component current magnitude is reduced, thereby decreasing RMS current. More specifically, the parameters (e.g., angle and magnitude) of the harmonics may be determined based on operational parameters of the modular multilevel converter, such as operating mode, AC terminal current, AC terminal voltage, power factor of the modular multilevel converter, DC terminal current, DC terminal voltage, a modulation index of the modular multilevel converter, storage component utilization, storage component voltage, number of storage components per arm, a usage coefficient, and the like.

For example, when the base frequency is 60 Hz, the modular multilevel converter may inject a 120 Hz (e.g., second order) harmonic with parameters that reduce magnitude of the storage component current at 60 Hz and 120 Hz (e.g., twice the base frequency). However, the 120 Hz harmonic may also increase magnitude of the storage component current at 180 Hz. Nevertheless, the reduction in magnitude of the storage component current at the lower frequencies (e.g., base frequency and twice the base frequency) may be greater than the increase in magnitude of the storage component current at the higher frequencies (e.g., three times the base frequency), thereby reducing the RMS current of the ultracapacitor.

Moreover, the one or more harmonics may be injected such that operation of the modular multilevel converter remains generally the same from the perspective of the AC side and the DC side. In some embodiments, the one or more harmonics may be injected in each leg such that they cancel out. For example, when the modular multilevel converter includes two legs, a first harmonic may be injected in a first leg and a second harmonic may be injected in a second leg. More specifically, the first harmonic and the second harmonic may be equal in magnitude, equal in frequency, 180° out of phase, and have a magnitude of zero at the AC terminals.

In this manner, the modular multilevel converter may maintain interoperation with the AC side and the DC side while facilitating a reduction in the RMS current of storage components (e.g., ultracapacitors) to improve life span of the storage components.

To help illustrate, one embodiment of a voltage system 10 is described in FIG. 1. In the depicted embodiment, the voltage system 10 includes a modular multilevel converter 12 electrically coupled between a DC side 14 and an AC side 16. As described above, the AC side 16 may generate and/or transmit AC electrical power and the DC side 14 may generate, transmit, and/or store DC electrical power. For example, the AC side 16 may include one or more AC power generators to generate AC electrical power, an AC grid to transmit AC electrical power, one or more AC loads that consumes AC electrical power, or any combination thereof. Additionally, the DC side 14 may include one or more DC power generators to generate DC electrical power, a DC grid to transmit DC electrical power, one or more DC loads that consumes DC electrical power, one or more DC storage components (e.g., batteries) that store DC electrical power, or any combination thereof.

In some embodiments, the voltage system 10 may be a high voltage direct current (HVDC) system or a high voltage alternative current (HVAC) system. Thus, in such embodiments, the AC side 16 may be a high voltage AC side and the DC side 14 may be a high voltage DC side. Additionally, the AC electrical power may be high voltage AC electrical power and the DC electrical power may be high voltage DC electrical power.

As described above, the modular multilevel converter 12 may facilitate transmitting electrical power between the DC side 14 and the AC side 16. For example, to facilitate transmitting electrical power from the AC side 16 to the DC side 14, the modular multilevel converter 12 may receive AC electrical power from the AC side 16, convert the AC electrical power to DC electrical power, and supply the DC electrical power to the DC side 14. Additionally, to facilitate transmitting electrical power from the DC side 14 to the AC side 16, the modular multilevel converter 12 may receive DC electrical power form the DC side 14, converter the DC electrical power to AC electrical power, and supply the AC electrical power to the AC side 16.

As will be described in more detail below, to facilitate conversion, the modular multilevel converter 12 includes multiple storage components (e.g., ultracapacitors) that are selectively connected and disconnected. Accordingly, a controller 18 may be employed to control operation of the modular multilevel converter 12. For example, the controller 18 may send control signals instructing the modular multilevel converter 12 to connect or disconnect one or more storage components. Additionally, the controller 18 may receive sensor signals from one or more sensors 20 coupled to the modular multilevel converter 12. For example, the sensors 20 may measure operational parameters such as current at a DC terminal, voltage at the DC terminal, current at an AC terminal, voltage at the AC terminal, temperature of storage components in the modular multilevel converter 12, or any combination thereof. The controller 18 may then process the sensor signals to determine operational parameters of the modular multilevel converter 12 and/or subsequent control signals.

To facilitate controlling operation, the controller 18 may include a processor 22 and memory 24. More specifically, the processor 22 may execute instructions stored in memory 24 and/or process data stored in memory 24. As such, the processor 22 may include one or more general purpose microprocessors, one or more application specific processors (ASICs), one or more field programmable logic arrays (FPGAs), or any combination thereof. Additionally, memory 24 may be a tangible, non-transitory, computer-readable medium that stores instructions executable by and data to be processed by the processor 22, such as random access memory (RAM), read only memory (ROM), rewritable flash memory, hard drives, optical discs, and the like.

For example, the controller 18 may instruct the modular multilevel converter 12 to inject a harmonic into legs of the modular multilevel converter 12. In some embodiments, controller 18 may determine parameters with which to inject the harmonic based at least in part on calibration data 26 stored in the memory 24. For example, the calibration data 26 may indicate frequency, angle, and/or magnitude of a second harmonic (e.g., twice base frequency) based on electrical power at the DC terminal (e.g., input DC voltage and input DC current), electrical power at the AC terminal (e.g., output AC voltage, output AC current, AC frequency), operational mode (e.g., transient or steady state), power factor, usage coefficient, and/or modulation index. As will be described in more detail below, injecting the harmonic may facilitate reducing the RMS current of the storage components and, thus, decrease temperature and increase life span of current sensitive storage components, such as ultracapacitors.

Figure 2:
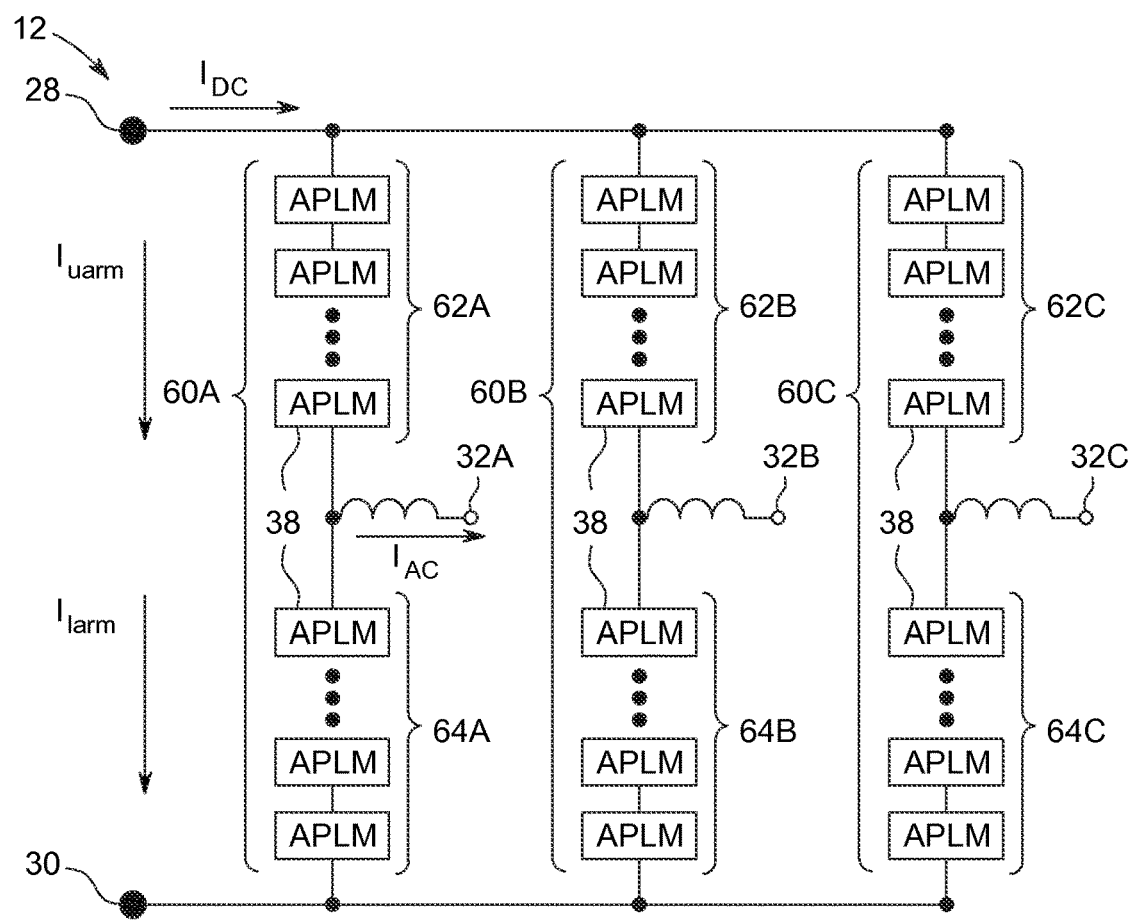
FIG. 2 is a block diagram of the modular multilevel converter of FIG. 1 including multiple active power link modules, in accordance with an embodiment.

One embodiment of a modular multilevel converter 12 is described in FIG. 2. It should be appreciated that the depicted modular multilevel converter 12 is merely intended to illustrative and not limiting. As described above, the modular multilevel converter 12 may be electrically coupled to the DC side 14. Accordingly, as depicted, the modular multilevel converter 12 includes a positive DC terminal 28 and a negative DC terminal 30. In this manner, DC electrical power may flow from the DC side 14 into the modular multilevel converter 12 and/or from the modular multilevel converter 12 into the DC side 14.

Additionally, as described above, the modular multilevel converter 12 may be electrically coupled to the AC side 16. In the depicted embodiment, the modular multilevel converter 12 may supply and/or receive three-phase electrical power from the AC side 16. Accordingly, as depicted, the modular multilevel converter 12 includes a first AC terminal 32A, a second AC terminal 32B, and a third AC terminal 32C. In this manner, a first phase (e.g., phase A), a second phase (e.g., phase B), and a third phase (e.g., phase C) of electrical power may flow from the AC side 16 into the modular multilevel converter 12 and/or from the modular multilevel converter 12 into the AC side 16.

As described above, to facilitate the output of AC electrical power and/or DC electrical power, the modular multilevel converter 12 may include multiple storage component modules that each selectively connects and disconnects a storage component (e.g., an ultracapacitor). In the depicted embodiment, active power link modules (APLMs) 38 include a storage component and switching components used to selectively connect the storage component.

Figure 3:
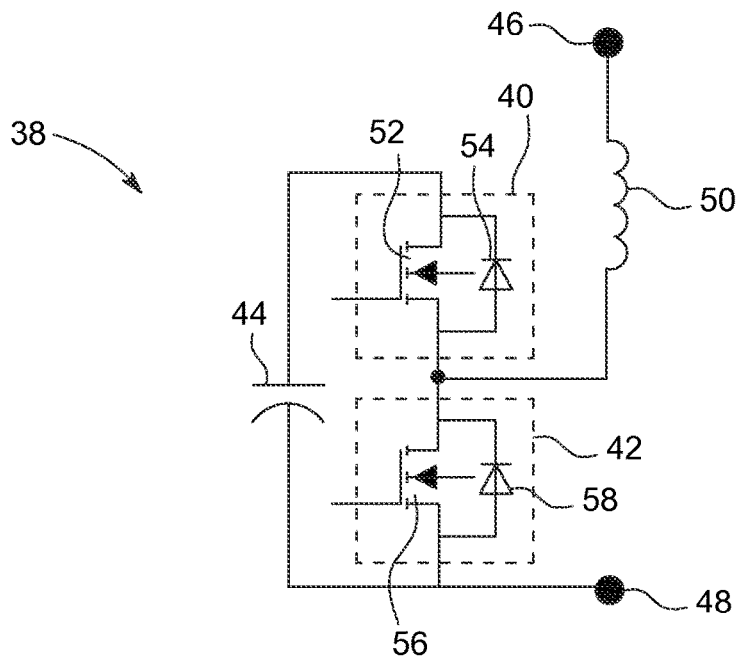
FIG. 3 is a block diagram of an active power link module of FIG. 2, in accordance with an embodiment.

To help illustrate, one embodiment of an active power link module 38 is described in FIG. 3. As depicted, the active power link module 38 includes a first switching component 40, a second switching component 42, an ultracapacitor 44, a first terminal 46, a second terminal 48, and an inductor 50. It should be noted that the active power link module 38 is merely intended to illustrative and not limiting. In other words, to simplify the following disclosure, the modular multilevel converter 12 is described as utilizing ultracapacitor 44 as storage components. However, one or ordinary skill in the art should be easily able to adapt the described techniques to other types of storage components, such as standard capacitors.

In the depicted embodiment, the ultracapacitor 44 may be connected when the first switching component 40 is on and the second switching component 42 is off. On the other hand, the ultracapacitor 44 may be disconnected with the first switching component 40 is off and the second switching component 42 is on. Various types of switching components may be used to connect or disconnect the ultracapacitor 44. For example, in the depicted embodiment, the first switching component 40 includes a first insulated-gate bipolar transistor (IGBT) 52 coupled in parallel with a first diode 54. Additionally, the second switching component 42 includes a second IGBT 56 coupled in parallel with a second diode 58.

Accordingly, when disconnected, current flowing into the first terminal 46 may flow through the inductor 50, through the second IGBT 56, and out the second terminal 48, thereby bypassing the ultracapacitor 44. Additionally, when disconnected, current flowing into the second terminal 48 may flow through the second diode 58, through the inductor 50, and out the second terminal 48, thereby bypassing the ultracapacitor 44. On the other hand, when connected, current flowing into the first terminal 46 may flow through the inductor 50, through the first diode 54, and into the ultracapacitor 44, thereby charging the ultracapacitor 44. Additionally, when connected, current may flow out of the ultracapacitor 44, through the first IGBT 52, through the inductor 50, and out the first terminal 46, thereby discharging the ultracapacitor 44.

In fact, organizing the active power link modules 38 into phase legs 60, as depicted in FIG. 2, may facilitate converting between three phase AC electrical power and DC electrical power. More specifically, as depicted, the active power link modules 38 are organized on a first phase leg 60A, a second phase leg 60B, and a third phase leg 60C. In some embodiments, an equal number of active power link modules 38 may be included on each phase leg 60.

On each phase leg 60, the active power link modules 38 may further be divided between an upper arm 62 and a lower arm 64. For example, in the depicted embodiment, the first phase leg 60A includes a first upper arm 62A electrically coupled between the positive DC terminal 28 and the first AC terminal 32A and a first lower arm 64A electrically coupled between the negative DC terminal 30 and the first AC terminal 32A. Additionally, the second phase leg 60B includes a second upper arm 62B electrically coupled between the positive DC terminal 28 and the second AC terminal 32B and a second lower arm 64B electrically coupled between the negative DC terminal 30 and the second AC terminal 32B. Furthermore, the third phase leg 60C includes a third upper arm 62C electrically coupled between the positive DC terminal 28 and the third AC terminal 32C and a third lower arm 64C electrically coupled between the negative DC terminal 30 and the third AC terminal 32C. In some embodiments, the active power link modules 38 on each phase leg 60 may be equally divided between its upper arm 62 and lower arm 64.

On each arm 62 and 64, the active power link modules 38 may be connected in series. For example, an upper arm 62 may include a first active power link module 38 and a second active power link module 38 coupled in series. More specifically, a first terminal 46 of the first active power link module 38 may be electrically coupled to the positive DC terminal 28. Additionally, a second terminal 48 of the first active power link module 38 may be electrically coupled to a first terminal 46 of the second active power link module 38. Furthermore, a second terminal 48 of the second active power link module 38 may be electrically coupled to an AC terminal 32.

In such an embodiment, a corresponding lower arm 64 may include a third active power link module 38 and a fourth active power link module 38 coupled in series. More specifically, a first terminal 46 of the third active power link module 38 may be electrically coupled to the AC terminal 32. Additionally, a second terminal 48 of the third active power link module 38 may be electrically coupled to a first terminal 46 of the fourth active power link module 38. Furthermore, a second terminal 48 of the fourth active power link module 38 may be electrically coupled to the negative DC terminal 30.

Figure 4:
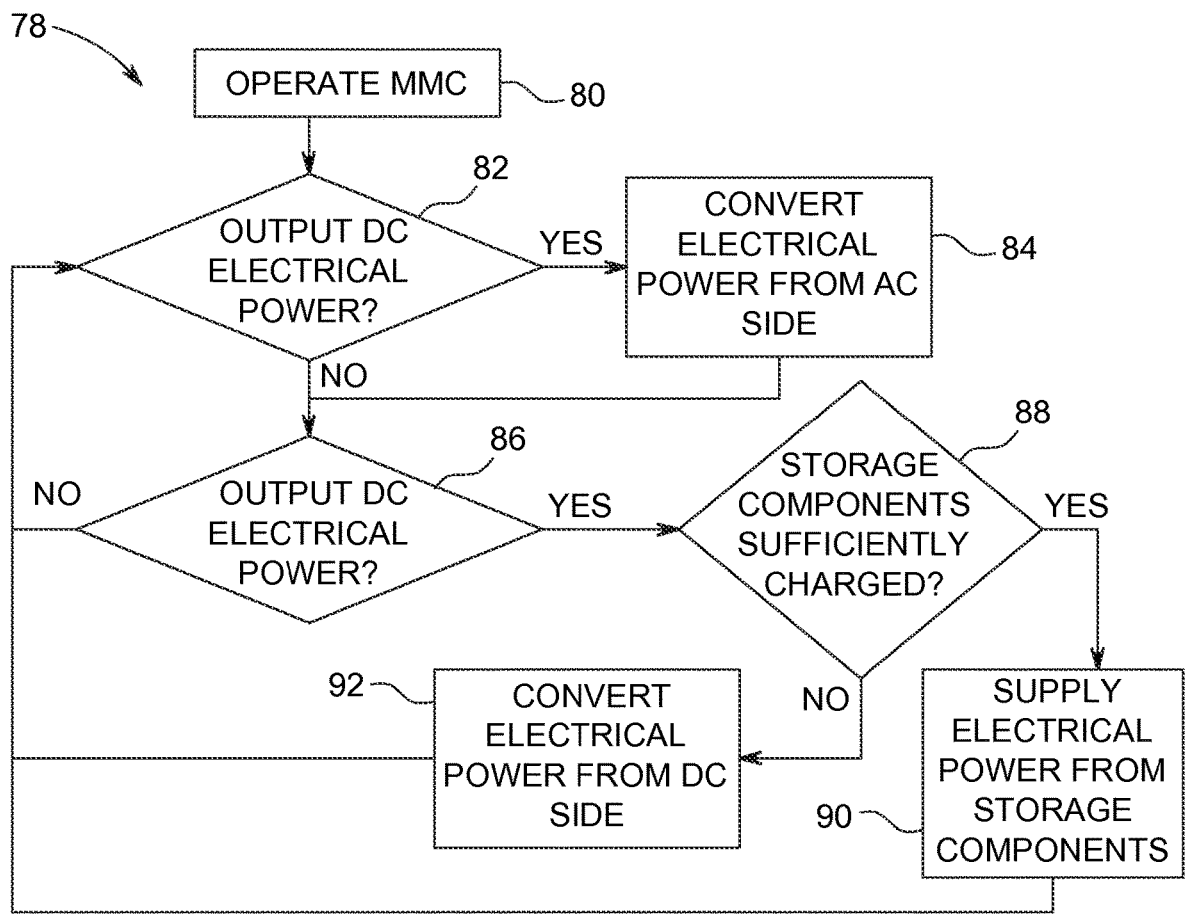
FIG. 4 is a flow diagram of a process for operating the modular multilevel converter of FIG. 1, in accordance with an embodiment.

In this manner, the active power link modules 38 may be controlled to output AC electrical power or DC electrical power. To help illustrate, one embodiment of a process 78 for operating a modular multilevel converter 12 is described in FIG. 4. Generally, the process 78 includes operating a module multilevel converter (process block 80), determining whether to output DC electrical power (decision block 82), converting electrical power from an AC side to supply DC electrical power (process block 84), determining whether to output AC electrical power (decision block 86), determining whether storage components are sufficiently charged (decision block 88), supplying electrical power from storage components to output AC electrical power when sufficiently charged (process block 90), and converting electrical power from a DC side to output AC electrical power when not sufficiently charged (process block 92). In some embodiments, the process 78 may be implemented by instructions stored in the controller memory 24 and/or other suitable tangible, non-transitory computer readable mediums that are executable by the controller processor 22 and/or other suitable processing circuitry.

Accordingly, in such embodiments, the controller 18 may control operation of the modular multilevel converter 12 (process block 80). As described above, the controller 18 may transmit control signals instructing the modular multilevel converter 12 to perform one or more control actions. In some embodiments, the control signals may instruct the modular multilevel converter 12 regarding operational mode and/or characteristics (e.g., magnitude and/or frequency) of output power. For example, the controller 18 may instruct the modular multilevel converter 12 to operate in a converter mode to output AC electrical power. On the other hand, the controller 18 may instruct the modular multilevel converter 12 to over in an inverter mode to output DC electrical power.

As such, the controller 18 may determine whether desirable to supply DC electrical power from the modular multilevel converter 12 (decision block 82). In other words, the controller 18 may determine whether to operate the modular multilevel converter 12 in the rectifier mode. In some embodiments, the controller 18 may determine the operational mode and/or characteristics of output electrical power based on instructions received from other computing devices and/or operator input instructions. For example, a supervisory computing device may instruct the controller 18 regarding the desired operational mode and/or characteristics of output electrical power to coordinate operation of multiple modular multilevel converters 12.

When operating in the rectifier mode, the controller 18 may instruct the module multilevel converter 12 to receive AC electrical power from the AC side 16 and convert the AC electrical power into DC electrical power (process block 84). In some embodiments, the controller 18 may instruct a first one or more active power link modules 38 in each upper arm 62 and lower arm 64 to disconnect its ultracapacitor 44 (e.g., turn off first switching device 40). As such, the second diodes 58 in the first one or more active power link modules 38 may cause positive current to flow into the upper arms 62 and negative current to flow into the lower arms 64, thereby rectifying the AC electrical power into DC electrical power.

Additionally, the controller 18 may instruct a second one or more power link modules 38 in each upper arm 62 and lower arm 64 to connect its ultracapacitor 44 (e.g., turn on first switching device 40). As such, the ultracapacitor 44 may output electrical power to adjust magnitude of the rectified DC electrical power. For example, the ultracapacitor 44 may output electrical power to smooth the DC electrical power. Furthermore, in some embodiments, the ultracapacitor 44 and the inductor 50 may act as a boost converter to control voltage of the DC electrical power. In this manner, the controller 18 may control operation of the modular multilevel converter 12 such that the modular multilevel converter 12 outputs DC electrical power with desired characteristics (e.g., voltage and/or ripple) to the DC side 14.

The controller 18 may also determine whether desirable to supply AC electrical power from the modular multilevel converter 12 (decision block 86). In other words, the controller 18 may determine whether to operate the modular multilevel converter 12 in the inverter mode. As described above, in some embodiments, the controller 18 may determine the operational mode and/or characteristics of output electrical power based on instructions received from other computing devices and/or operator input instructions.

When charged, an ultracapacitor 44 may output zero volts when disconnected and a positive voltage when connected. As used herein, a "duty ratio" is intended to describe percentage of a duration a storage component (e.g., ultracapacitor 44) is connected. Thus, adjusting the duty ratio (e.g., duration the ultracapacitor 44 is connected) may control the average voltage output by the ultracapacitor 44. For example, when the duty ratio is 100% the average voltage output by the ultracapacitor 44 may be the positive voltage. On the other hand, when the duty ratio is 0% the average voltage output by the ultracapacitor 44 may be zero volts. Additionally, the duty ratio may be adjusted between 0% and 100% to adjust the average voltage output by the ultracapacitor 44 between zero volts and the positive voltage. As such, when the duty ratio varies sinusoidally, the average output voltage output may by sinusoidal with a DC offset.

Referring back to FIG. 2, multiple active power link modules 38 may be connected in series on the upper arms 62 and the lower arms 64. For example, a first set of active power link modules 38 are connected in series on the first upper arm 62A and a second set of active power link modules 38 are connected in series on the first lower arm 64A. As such, the first upper arm 62A may supply a first voltage to the first AC terminal 32A and the first lower arm 64A may supply a second voltage to the first AC terminal 32A. In some embodiments, the duty ratios of the ultracapacitors 44 may be controlled so that the first voltage and the second voltage are both sinusoidal, but antiphase from one another. Thus, when combined, the modular multilevel converter 12 may output one phase of AC electrical power from the first AC terminal 32A.

As described above, the modular multilevel converter 12 may output AC electrical power using DC electrical power from the DC side 14 or bypass the DC side 14 and output electrical power using electrical energy stored in the ultracapacitors 44. Thus, returning to FIG. 4, when in the inverter mode, the controller 18 may determine whether the ultracapacitors 44 (e.g., storage components) are sufficiently charged (process block 88). More specifically, the controller 18 may determine whether the ultracapacitors are sufficiently charged based on whether amount of electrical energy stored in the ultracapacitors 44 is above a threshold. In some embodiments, the controller 18 may determine amount of electrical energy stored in an ultracapacitor 44 based at least in part on its voltage, which may be measured by a voltage sensor 20.

Additionally, in some embodiments, the controller 18 may determine amount of electrical energy store in an ultracapacitor 44 based on previous operation of the modular multilevel converter 12. For example, when the modular multilevel converter 12 previously operated in a steady-state inverter mode for longer than a threshold duration, the controller may determine that the ultracapacitor 44 is sufficiently charged. As used herein, the "steady-state inverter mode" is intended to describe when the modular multilevel converter 12 receives DC electrical power from the DC side 14, utilizes the storage components (e.g., ultracapacitors 44) to convert the DC electrical power to AC electrical power, thereby enabling the storage components to charge, and outputs the AC electrical power to the AC side 16. On the other hand, a "transient inverter mode" is intended to describe when the modular multilevel converter 12 utilizes only electrical energy stored in the storage components (e.g., ultracapacitors 44) to generate AC electrical power, thereby gradually discharging the storage components, and outputs the AC electrical power to the AC side 16.

Thus, when desirable to output AC electrical power, the controller 18 may determine whether to operate the modular multilevel converter 12 in the steady-state inverter mode or the transient inverter mode based at least in part on whether the ultracapacitors 44 are sufficiently charged (e.g., above a threshold) to generate AC electrical power without being recharged by the DC side 14. More specifically, when the ultracapacitors 44 are not sufficiently charged, the controller 18 may instruct the modular multilevel converter 12 to operate in the steady-state inverter mode (process block 92).

To help illustrate, operation of a modular multilevel converter 12 in the steady-state inverter mode is described with timing diagrams depicted in FIGS. 5A-5D. To simplify discussion, the timing diagrams relate to a single leg 60 that includes an upper arm 62 and a lower arm 64. Additionally, the upper arm 62 includes an upper ultracapacitor 44 and the lower arm 64 includes a lower ultracapacitor 44. One or ordinary skill in the art will easily be able to expand the described techniques to multiple legs 60 with multiple ultracapacitors 44 on each upper arm 62 and lower arm 64.

Figure 5A:
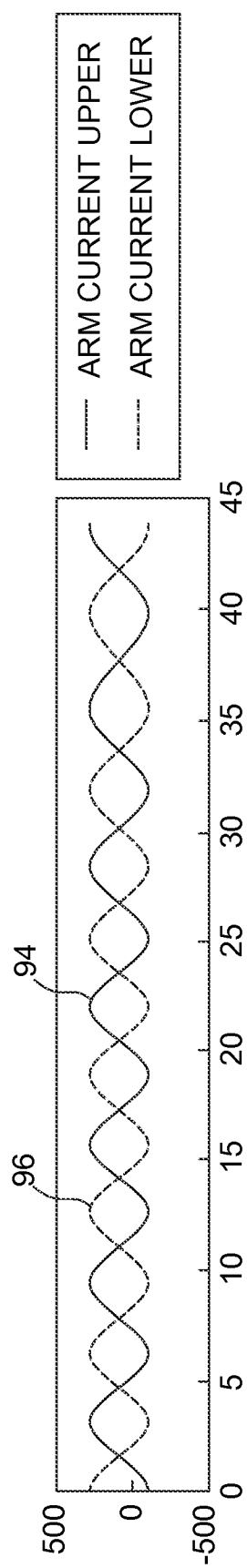
FIG. 5A is a plot of upper arm current and lower arm current when operating in a steady-state inverter mode, in accordance with an embodiment.
Figure 5B:
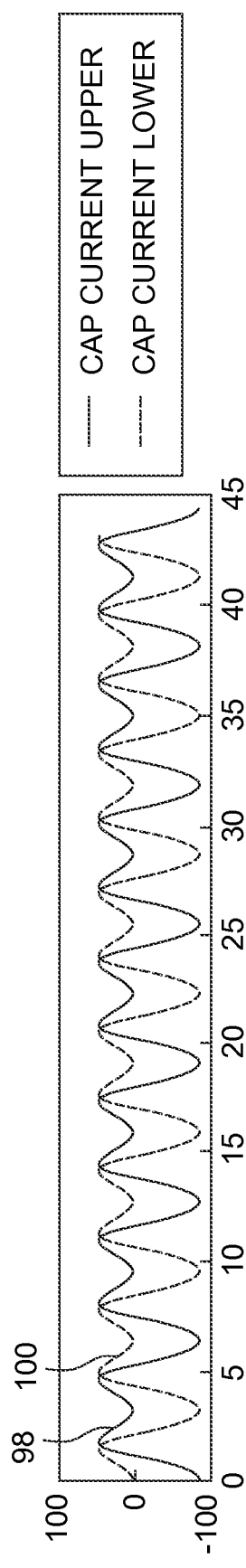
FIG. 5B is a plot of upper ultracapacitor current and lower ultracapacitor current when operating in the steady-state inverter mode, in accordance with an embodiment.
Figure 5C:
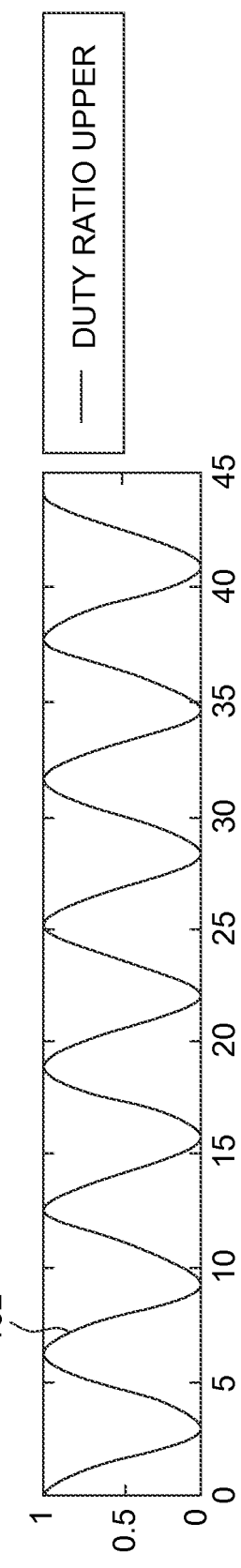
FIG. 5C is a plot of an upper ultracapacitor duty rate when operating in the steady-state inverter mode, in accordance with an embodiment.

More specifically, FIG. 5A is a timing diagram describing an upper arm current 94 and a lower arm current 96 over time. Additionally, FIG. 5B is a timing diagram describing an upper ultracapacitor current 98 and a lower ultracapacitor current 100 over time. FIG. 5C is a timing diagram of upper ultracapacitor duty ratio 102 used to selectively connect the upper ultracapacitor 44. Furthermore, FIG. 5D is a timing diagram describing upper ultracapacitor voltage 104, lower ultracapacitor voltage 106, and the DC component of the phase leg current 108.

When operating in the steady-state inverter mode, the modular multilevel converter 12 receives DC electrical power from the DC side 14. Additionally, the upper arm 62 and the lower arm 64 may each generate half of the AC electrical power output via the electrical terminal 32. Thus, the upper arm current 94 may be described as follows:

$$i_{uarm}(t) = I_{DC}1/2I_{AC}*\cos(x+dx) \qquad (1)$$

where $i_{uarm}$ is the upper arm current 94, t is time, $I_{DC}$ is the DC current from the DC side 14, $I_{AC}$ is the AC current supplied to the AC terminal 32, x is the base phase angle (e.g., ωt), and dx is the phase shift between AC current and AC voltage at the AC terminal 32, which may be proportional to the power factor. On the other hand, the lower arm current 96 may be defined as follows:

$$i_{larm}(t) = I_{DC} - 1/2I_{AC}*\cos(x+dx) \qquad (2)$$

where $i_{larm}$ is the lower arm current 96, t is time, $I_{DC}$ is the DC current from the DC side 14, $I_{AC}$ is the AC current supplied to the AC terminal 32, x is the base phase angle (e.g., ωt), and dx is the phase shift between AC current and AC voltage at the AC terminal 32.

Thus, as described in FIG. 5A, the upper arm current 94 and the lower arm current 96 are each sinusoidal with a DC offset. Additionally, the upper arm current 94 and the lower arm current 96 are antiphase. In the described example, the upper arm current 94 is defined such that current flows away from the positive DC terminal 28 when positive and toward the positive DC terminal 28 when negative. On the other hand, the lower arm current 96 is defined such that current flows toward the negative DC terminal 30 when positive and away from the negative DC terminal 30 when negative.

Accordingly, the upper ultracapacitor 44 may be charged when the upper arm current 94 is positive and discharged when the upper arm current 94 is negative. Thus, as described in FIG. 5B, the upper ultracapacitor current 98 is positive when the upper arm current 94 is positive, thereby charging the upper ultracapacitor, and negative when the upper arm current 94 is negative, thereby discharging the upper ultracapacitor 44. Additionally, as described in FIG. 5D, the upper ultracapacitor voltage 104 gradually increases as the upper ultracapacitor 44 charges and decreases as the upper ultracapacitor 44 discharges.

Similarly, the lower ultracapacitor 44 may be charged when the lower arm current 96 is positive and discharged when the lower arm current 96 is negative. Thus, as described in FIG. 5B, the lower ultracapacitor current 100 is positive when the lower arm current 96 is positive, thereby charging the lower ultracapacitor 44, and negative when the lower arm current 96 is negative, thereby discharging the lower ultracapacitor 44. Additionally, as described in FIG. 5D, the lower ultracapacitor voltage 106 gradually increases as the lower capacitor 44 charges and decreases as the lower ultracapacitor 44 discharges.

As described above, an ultracapacitor 44 may be charged and discharged when connected. More specifically, duty ratio is used to describe duration the ultracapacitor 44 is connected. As such, average voltage output by the ultracapacitor 44 may vary with the duty ratio. In other words, to enable producing sinusoidal AC electrical power, the duty ratio of the upper ultracapacitor 44 and the duty ratio of the lower ultracapacitor 44 may vary sinusoidally. For example, the upper ultracapacitor duty ratio 102 may be described as follows:

$$d_u(t) = 1/2k(1 + M\cos(x)) \qquad (3)$$

where $d_u$ is the upper duty ratio, t is time, k is a usage coefficient, M is the modulation index, and x is the base phase angle (e.g., ωt). Additionally, the usage coefficient k may be described as follows:

$$k = \frac{V_{DC}}{N * V_{cap}} \qquad (4)$$

where $V_{DC}$ is the DC voltage between the positive DC terminal 28 and the negative DC terminal 30, N is the number of ultracapacitors 44 on the upper arm 62, and $V_{cap}$ is the voltage of the upper ultracapacitor 44. Accordingly, as described in FIG. 5C, the upper duty ratio 102 is varied sinusoidally between 100% and 0%, which facilitates outputting sinusoidal AC electrical voltage (if sinusoidal voltage but zero current=no power).

On the other hand, the duty ratio of the lower capacitor may be as follows:

$$d_l(t) = 1/2k(1 - M\cos(x)) \qquad (5)$$

where $d_l$ is the lower duty ratio, t is time, k is the usage coefficient, M is the modulation index, and x is the base phase angle (e.g., ωt). Thus, the lower duty ratio may vary sinusoidally between 100% and 0% antiphase from the upper duty ratio 102, which facilitate outputting the sinusoidal AC electrical voltage.

Since current may flow into or out of the ultracapacitor 44 when connected, current conducted by an ultracapacitor 44 may vary as the duty ratio varies. More specifically, the current in an ultracapacitor 44 may be the product of its duty cycle and arm current. For example, the upper ultracapacitor current 98 may be a product of the upper ultracapacitor duty ratio 102 and the upper arm current 94. As such, the upper ultracapacitor current 98 may be described as follows:

$$i_{ucap}(t) = d_u(t) * i_{uarm}(t) \qquad (6)$$

where $i_{ucap}$ is the upper ultracapacitor current 98, t is time, $d_u$ is the upper duty cycle 102, and $i_{uarm}$ is the upper arm current 94. Similarly, the lower ultracapacitor current 100 may be a product of the lower ultracapacitor duty ratio and the lower arm current 96. As such, the lower ultracapacitor current 100 may be described as follows:

$$i_{lcap}(t) = d_l(t) * i_{larm}(t) \qquad (7)$$

where $i_{lcap}$ the lower ultracapacitor current 100, t is time, $d_l$ is the upper duty cycle, and $i_{larm}$ is the lower arm current 96. Thus, when the duty ratio and the arm currents each include multiple frequency components, the upper ultracapacitor current 98 and the lower ultracapacitor current 100 also each include multiple frequency components.

To help illustrate, FIGS. 6A-6C describe the upper duty ratio 102, the upper arm current 94, and the upper ultracapacitor current 98 in the frequency domain. More specifically, FIGS. 6A-6C describe magnitude of frequency components when outputting 60 Hz base frequency AC electrical power. For example, FIG. 6A describes that the upper duty ratio 102 includes a DC (e.g., 0 Hz) component and a base frequency (e.g., 60 Hz) component. Additionally, FIG. 6B describes that the upper arm current 94 includes a DC component and a base frequency component.

As described above, the upper ultracapacitor current 98 may be the product of the upper duty ratio 102 and the upper arm current 94. Thus, in some embodiments, the upper ultracapacitor current 98 may include a DC component, a base frequency component, and a second harmonic (e.g., 120 Hz) component. However, in the depicted embodiment, the modular multilevel converter 12 is operated such that the DC component of the upper ultracapacitor current 98 is zero.

The root-mean-square (RMS) ultracapacitor current may be determined based on the magnitude of each frequency component of the ultracapacitor current. For example, the RMS ultracapacitor current may be determined at follows:

$$I_{cap\_RMS} = \sqrt{I_0^2 + \frac{I_1^2 + I_2^2 + I_3^2 + \ldots}{2}} \qquad (8)$$

where $I_{cap\text{-}RMS}$ is the RMS ultracapacitor current, $I_0$ is the DC component of the ultracapacitor current, $I_1$ is the base frequency component of the ultracapacitor current, $I_2$ is the second harmonic component of the ultracapacitor current, and $I_3$ is the third harmonic component of the ultracapacitor current.

The frequency components of the ultracapacitor current may be determined based on equation (6). For example, when operating in the steady-state inverter mode, the DC component of the ultracapacitor current may be described as follows:

$$I_0 = \frac{I_{DC} * k}{2} - \frac{I_{AC} M k * \cos(dx)}{8} \qquad (9)$$

where $I_0$ is the DC component of the ultracapacitor current, $I_{DC}$ is the is the DC current from the DC side 14, $I_{AC}$ is the AC current supplied to the AC terminal 32, k is the usage coefficient, M is the modulation index, and dx is the phase shift between AC current and AC voltage at the AC terminal 32. In some embodiments, the modular multilevel converter 12 may be operated so that the DC current is as follows:

$$I_{DC} = \frac{I_{AC} M}{4} \cos(dx) \qquad (10)$$

where $I_{DC}$ is the is the DC current from the DC side 14, $I_{AC}$ is the AC current supplied to the AC terminal 32, k is the usage coefficient, M is the modulation index, and dx is the phase shift between AC current and AC voltage at the AC terminal 32. In such embodiments, the DC component of the ultracapacitor current may be zero when operating in the steady-state inverter mode.

Additionally, when operating in the steady-state inverter mode, the base frequency component of the ultracapacitor current may be described as follows:

$$I_1 = \frac{\sqrt{k^2(2I_{DC}M - I_{AC}\cos(dx))^2 + I_{AC}^2 k^2(\sin(dx))^2}}{4} \qquad (11)$$

where $I_1$ is the base component of the ultracapacitor current, $I_{DC}$ is the is the DC current from the DC side 14, $I_{AC}$ is the AC current supplied to the AC terminal 32, k is the usage coefficient, M is the modulation index, and dx is the phase shift between AC current and AC voltage at the AC terminal 32. The second harmonic component of the ultracapacitor current may be described as follows:

$$I_2 = \frac{\sqrt{I_{AC}^2 k^2 (M\cos(dx))^2 + I_{AC}^2 k^2 (M\sin(dx))^2}}{8} \qquad (12)$$

where $I_2$ is the second harmonic component of the ultracapacitor current, $I_{DC}$ is the is the DC current from the DC side 14, $I_{AC}$ is the AC current supplied to the AC terminal 32, k is the usage coefficient, M is the modulation index, and dx is the phase shift between AC current and AC voltage at the AC terminal 32. Furthermore, the higher harmonic (e.g., third harmonic) components may be equal to zero.

Returning to FIG. 4, when the ultracapacitors 44 are sufficiently charged, the controller 18 may instruct the modular multilevel converter 12 to operate in the transient inverter mode (process block 90). As described above, increased storage capacity may enable the ultracapacitors 44 to supply DC electrical power used to generate the AC electrical power for an extended duration. As such, when operating in the transient inverter mode, the modular multilevel converter 12 may serve as a buffer to reduce harmonic current drawn from DC 14 side by temporarily bypassing the DC side 14.

To help illustrate, operation of a modular multilevel converter 12 in the transient inverter mode is described with timing diagrams depicted in FIGS. 7A-7D. To simplify discussion, the timing diagrams relate to a single phase leg 60 that includes an upper arm 62 and a lower arm 64. Additionally, the upper arm 62 includes an upper ultracapacitor 44 and the lower arm 64 includes a lower ultracapacitor 44. One or ordinary skill in the art will easily be able to expand the described techniques to multiple phase legs 60 with multiple ultracapacitors 44 on each upper arm 62 and lower arm 64.

Figure 7A:
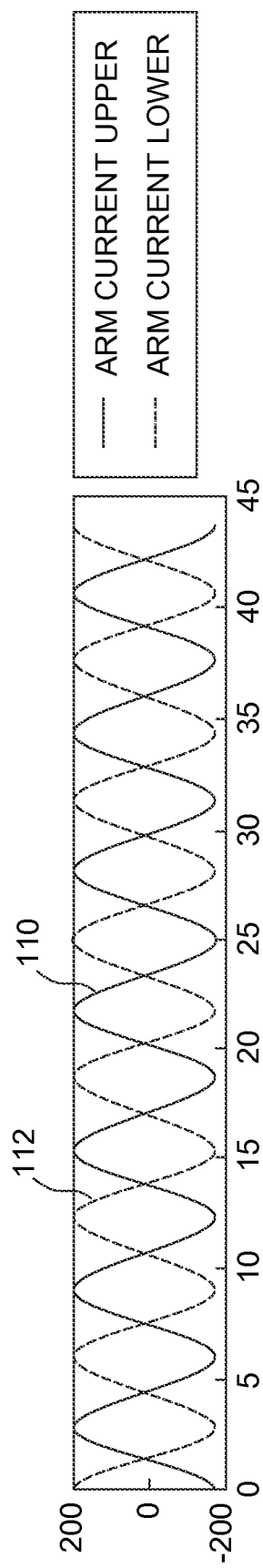
FIG. 7A is a plot of upper arm current and lower arm current when operating in a transient inverter mode, in accordance with an embodiment.
Figure 7B:
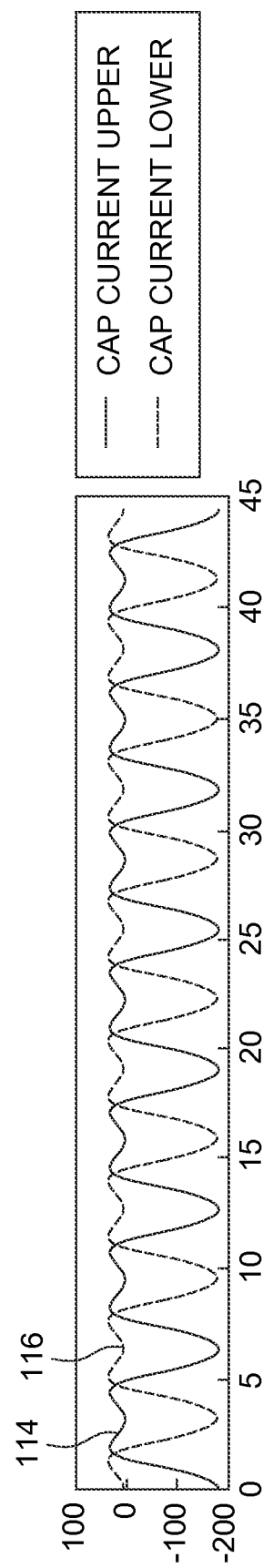
FIG. 7B is a plot of upper ultracapacitor current and lower ultracapacitor current when operating in the transient inverter mode, in accordance with an embodiment.
Figure 7C:
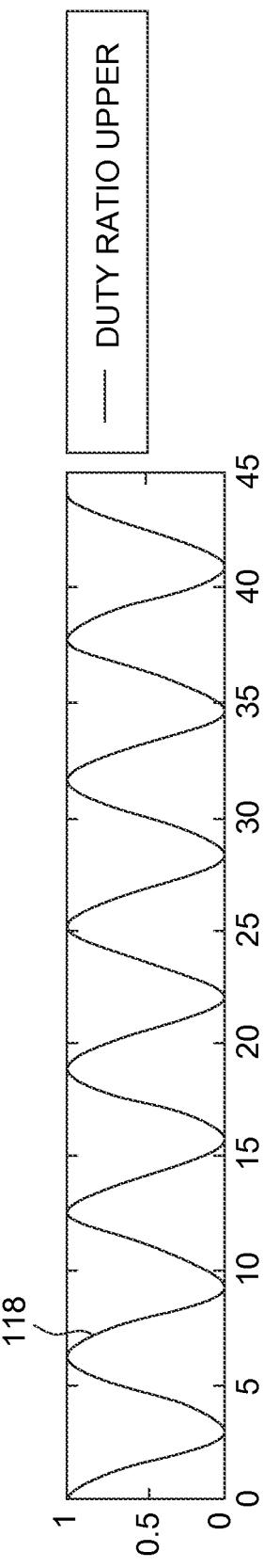
FIG. 7C is a plot of an upper ultracapacitor duty ratio when operating in the transient inverter mode, in accordance with an embodiment.

More specifically, FIG. 7A is a timing diagram describing upper arm 110 and lower arm current 112 over time. Additionally, FIG. 7B is a timing diagram describing upper ultracapacitor current 114 and lower ultracapacitor current 116 over time. FIG. 7C is a timing diagram describing upper ultracapacitor duty ratio 118 used to selectively connect the upper ultracapacitor 44. Furthermore, FIG. 7D is a timing diagram describing upper ultracapacitor voltage 120, lower ultracapacitor voltage 122, and phase leg current 124.

As described above, when operating in the transient inverter mode, the modular multilevel converter 12 may not receive DC electrical power from the DC side 14. Instead, the upper arm 62 and the lower arm 64 may each generate half of the AC electrical power output at the AC electrical terminal 32 using electrical energy stored in the ultracapacitors 44. Thus, the upper arm current 110 may be described as follows:

$$i_{uarm}(t) = 1/2 I_{AC} * \cos(x + dx) \qquad (13)$$

where $i_{uarm}$ is the upper arm current 110, t is time, $I_{DC}$ is the DC current from the DC side 14, $I_{AC}$ is the AC current supplied to the AC terminal 32, x is the base phase angle (e.g., ωt), and dx is the phase shift between AC current and AC voltage at the AC terminal 32. Additionally, the lower arm current 112 may be described as follows:

$$i_{larm}(t) = -1/2 I_{AC} * \cos(x + dx) \qquad (14)$$

where $i_{Iarm}$ is the upper arm current 112, t is time, $I_{DC}$ is the DC current from the DC side 14, $I_{AC}$ is the AC current supplied to the AC terminal 32, x is the base phase angle (e.g., ωt), and dx is the phase shift between AC current and AC voltage at the AC terminal 32.

Thus, as described in FIG. 7A, the upper arm current 110 and the lower arm current 112 are sinusoidal and antiphase and, as described in FIG. 7D, the leg current 125 is zero. In the described example, the upper arm current 110 is defined such that current flows away from the positive DC terminal 28 when positive and toward the positive DC terminal 28 when negative. On the other hand, the lower arm current 112 is defined such that current flows toward the negative DC terminal 30 when positive and away from the negative DC terminal 30 when negative.

Accordingly, the upper ultracapacitor 44 may be charged when the upper arm current 110 is positive and discharged when the upper arm current 110 is negative. Thus, as described in FIG. 7B, the upper ultracapacitor current 114 is positive when the upper arm current 110 is positive, thereby charging the upper ultracapacitor 44, and negative when the upper arm current 110 is negative, thereby discharging the upper ultracapacitor 44.

However, since the DC side 14 is bypassed, the upper ultracapacitor 44 is charged by current output by the lower ultracapacitor 44, which is also used to generate the AC electrical power. As such, charging of the upper ultracapacitor 44 may be reduced when operating in the transient inverter mode compared to the steady-state inverter mode. Accordingly, as described in FIG. 7D, the upper ultracapacitor voltage 120 minimally increases as the upper ultracapacitor 44 charges and decreases as the upper ultracapacitor 44 discharges. Thus, the upper ultracapacitor 44 gradually reduces stored electrical energy the longer the modular multilevel converter 12 operates in the transient inverter mode.

Similarly, the lower ultracapacitor 44 may be charged when the lower arm current 112 is positive and discharged when the lower arm current 112 is negative. Thus, as described in FIG. 7B, the lower ultracapacitor current 116 is positive when the lower arm current 112 is positive, thereby charging the lower ultracapacitor 44, and negative when the lower arm current 112 is negative, thereby discharging the lower ultracapacitor 44.

However, since the DC side 14 is bypassed, the lower ultracapacitor 44 is charged by current output by the upper ultracapacitor 44, which is also used to generate the AC electrical power. As such, charging of the lower ultracapacitor 44 may be reduced when operating in the transient inverter mode compared to the steady-state inverter mode. Accordingly, as described in FIG. 7D, the lower ultracapacitor voltage 122 minimally increases as the lower ultracapacitor 44 charges and decreases as the lower ultracapacitor 44 discharges. Thus, the lower ultracapacitor 44 gradually reduces stored electrical energy the longer the modular multilevel converter 12 operates in the transient inverter mode.

To produce the same AC electrical power, the duty cycle of the ultracapacitors remains substantially the same when operating in the transient inverter mode and when operating in the steady-state inverter mode. Thus, as depicted in FIG. 7C, the upper duty ratio 118 varies sinusoidally between 100% and 0% as described by equation (3). On the other hand, duty ratio of the lower ultracapacitor 44 may vary sinusoidally between 100% and 0% antiphase from the upper duty ratio 118 as described by equation (5).

Additionally, as described above, the current flowing in an ultracapacitor 44 may vary as the duty ratio varies. More specifically, the current in the ultracapacitor 44 may be the product of its duty cycle and arm current. As such, the upper ultracapacitor current 114 may described by equation (6) and the lower ultracapacitor current 116 may described by equation (7). Thus, when the duty ratio and the arm currents each include multiple frequency components, the upper ultracapacitor current 114 and the lower ultracapacitor current 116 also each include multiple frequency components.

To help illustrate, FIGS. 8A-8C describe the upper duty ratio 118, the upper arm current 110, and the upper ultracapacitor current 114 in the frequency domain. More specifically, FIGS. 8A-8C describe magnitude of frequency components when outputting 60 Hz base frequency AC electrical power. For example, FIG. 8A describes that the upper duty ratio 118 includes a DC (e.g., 0 Hz) component and a base frequency (e.g., 60 Hz) component. Additionally, FIG. 8B describes that the upper arm current 110 includes a DC component and a base frequency component.

As described above, the upper ultracapacitor current 98 may be the product of the upper duty ratio 102 and the upper arm current 94. Thus, as depicted in FIG. 6C, the upper ultracapacitor current 114 includes a DC component, a base frequency component, and a second harmonic (e.g., 120 Hz) component. Additionally, as depicted, the DC component of the upper ultracapacitor current 114 is non-zero because the upper ultracapacitor 44 supplies real power to generate the AC electrical power.

Additionally, as described above, the root-mean-square (RMS) ultracapacitor current may be determined using equation (8). However, when operating in the transient inverter mode, the DC current supplied to the modular multilevel converter 12 from the DC side 14 may be zero. As such, when operating in the transient inverter mode, the DC component of the ultracapacitor current may be described as follows:

$$I_0 = -\frac{I_{AC}Mk * \cos(dx)}{8} \tag{15}$$

where $I_0$ is the DC component of the ultracapacitor current, $I_{AC}$ is the AC current supplied to the AC terminal 32, k is the usage coefficient, M is the modulation index, and dx is the phase shift between AC current and AC voltage at the AC terminal 32. Additionally, the base frequency component of the ultracapacitor current may be described as follows:

$$I_1 = \frac{\sqrt{k^2(-I_{AC}\cos(dx))^2 + I_{AC}^2 k^2 (\sin(dx))^2}}{4} \tag{16}$$

where $I_1$ is the base component of the ultracapacitor current, $I_{AC}$ is the AC current supplied to the AC terminal 32, k is the usage coefficient, M is the modulation index, and dx is the phase shift between AC current and AC voltage at the AC terminal 32. Furthermore, when operating in the transient inverter mode, the second harmonic component of the ultracapacitor current may still be described by equation (12).

To facilitate reducing temperature of storage components (e.g., ultracapacitors 44) the modular multilevel converter 12 may inject additional harmonic current to reduce the RMS storage component current. In some embodiments, the controller 18 may instruct the modular multilevel converter 12 to inject harmonics with parameters determined by executing algorithms stored in the controller memory 24. In other embodiments, the controller 18 may instruct the modular multilevel converter 12 to inject harmonics with parameters determined based on calibration data 26 stored in the controller memory 26

Figure 9:
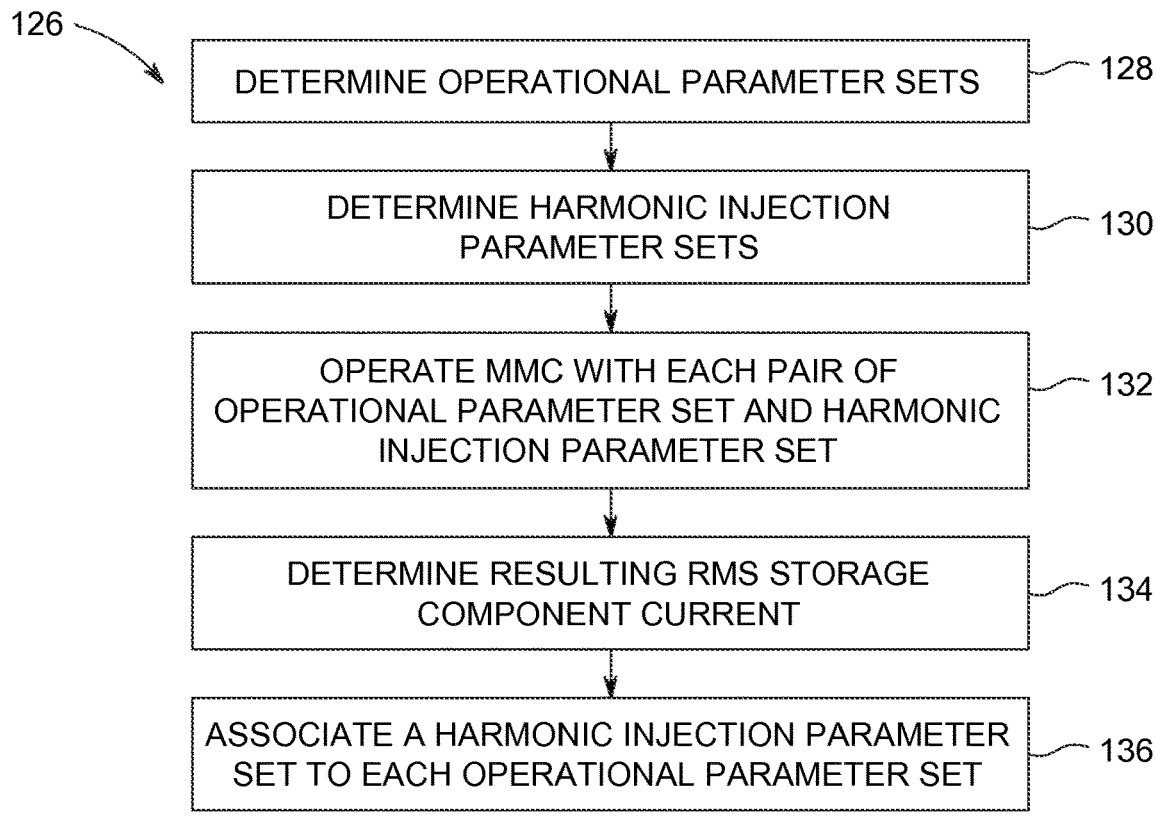
FIG. 9 is a flow diagram of a process for tuning calibration data used to determine harmonic injection parameters, in accordance with an embodiment.

In some embodiments, the calibration data 27 may be tuned to the modular multilevel converter 12. One embodiment of a process 126 for tuning calibration data 26 is described in FIG. 9. Generally, the process 126 includes determining operational parameters sets (process block 128), determining harmonic injection parameters sets (process block 130), operating the modular multilevel converter with each pair of operational parameter set and harmonic injection parameter set (process block 132), determining resulting root-mean-square (RMS) storage component current (process block 134), associate a harmonic injection parameter set to each operational parameter set (process block 136). In some embodiments, the process 126 may be implemented by instructions stored in the controller memory 24 and/or other suitable tangible, non-transitory computer readable mediums that are executable by the controller processor 22 and/or other suitable processing circuitry. Additionally, in some embodiments, the process 126 may be implemented by a manufacturer or an operator during commissioning of the modular multilevel converter 12.

Accordingly, in such embodiments, the controller 18 may determine operational parameter sets of the modular multilevel converter 12 (process block 128). More specifically, the operational parameter sets may include operational parameters of the modular multilevel converter 12, such as operational mode, AC terminal current, AC terminal voltage, power factor of the modular multilevel converter 12, DC terminal current, DC terminal voltage, a modulation index of the modular multilevel converter 12, storage component utilization, storage component voltage, number of storage components per arm, a usage coefficient, and the like. In some embodiments, the operational parameter sets under consideration may be input to the controller 18 by the manufacturer.

Additionally, the controller 18 may determine harmonic injection parameter sets with which to inject harmonics (process block 130). More specifically, the harmonic injection parameter sets may include parameters, such as frequency, angle and/or magnitude. In some embodiments, the harmonic injection parameter sets under consideration may be input to the controller 18 by the manufacturer.

The controller 18 may then operate the modular multilevel converter 12 with each pair of operational parameter set and harmonic injection parameter set (process block 132). More specifically, for each pair, the controller 18 may instruct the modular multilevel converter 12 to operate with an operational parameter set and instruct the modular multilevel converter 12 to inject harmonics based on the harmonic injection parameters.

While operating at each pair, the controller 18 may determine the resulting root-mean-square (RMS) storage component current (process block 134). In some embodiments, the controller 18 may receive may receive measurements from sensors 20 that indicate the DC current, the AC current, the DC voltage, the AC voltage, or any combination thereof. Based on the measurements, the controller 18 may determine the modulation index, the power factor, the usage coefficient, or any combination thereof. As such, the controller 18 may determine the RMS storage component current using equation (8).

The controller 18 may then associate a harmonic injection parameter set to each operational parameter set (process block 136). In some embodiments, the controller 18 may associate the operational parameter set to a harmonic injection parameter set that results in the lowest RMS storage component current. Additionally, in some embodiments, the controller 18 may store the associations in the controller memory 24 as calibration data 26. For example, the calibration data 26 may indicate angle and/or magnitude which to inject a harmonic based at least in part on modulation index, power factor, and operating mode of the modular multilevel converter 12.

Figure 10:
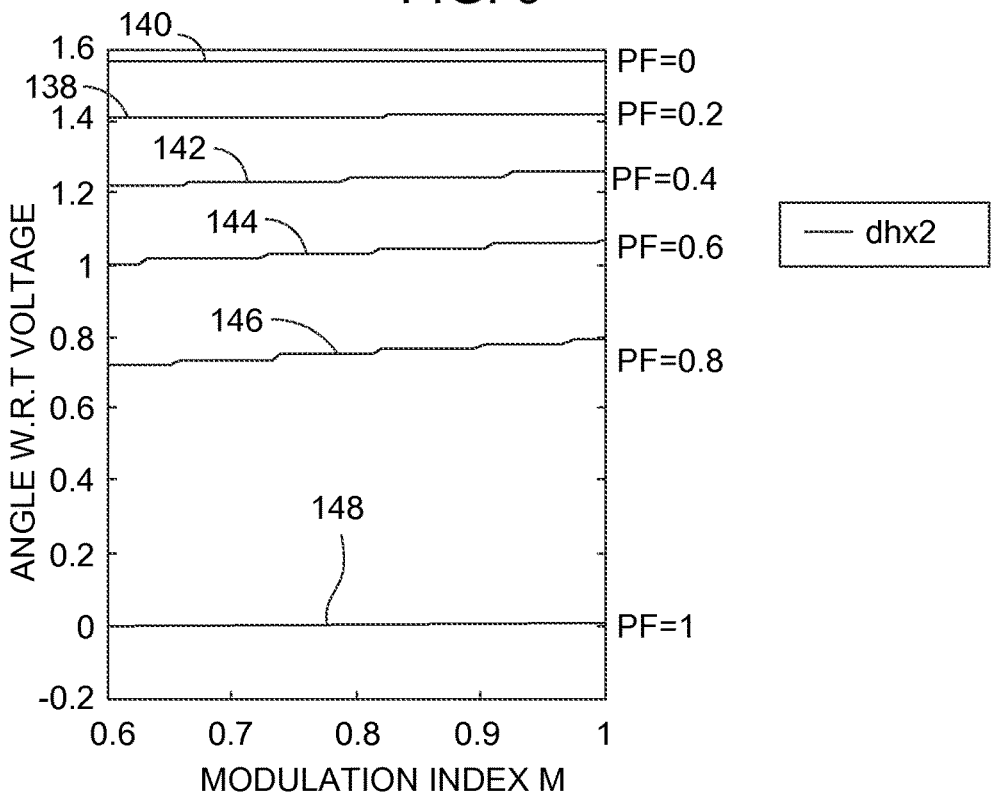
FIG. 10 is a plot representing a portion of calibration data describing a relationship between harmonic injection angle, modulation index, and power factor when operating in the steady-state inverter mode, in accordance with an embodiment.

To help illustrate, a representation of calibration data 26 describing angle dhx2 of a second harmonic current (e.g., phase shift with respect to AC voltage at the AC terminal 32) when operating in the steady-state inverter mode is described in FIG. 10. In the depicted embodiment, when the modulation index is between 0.6-1, the angle of the second harmonic current is described using a first angle curve 138 when the power factor is zero, a second angle curve 140 when the power factor is 0.2, a third angle cure 142 when the power factor is 0.4, a fourth angle curve 144 when the power factor is 0.6, a fifth angle curve 146 when the power factor is 0.8, and a sixth angle curve 148 when the power factor is 1.

In such embodiments, the calibration data 26 may indicate the angle with which to inject a second harmonic in the modular multilevel converter 12 when operating in the steady-state inverter mode to reduce RMS storage component current based at least in part on modulation index and power factor of the modular multilevel converter 12. In some embodiments, the calibration data 26 may store the relationship may be stored in a look-up-table (LUT) to facilitate determining the angle. It should be noted that the calibration data 26 described in FIG. 10 is merely intended to illustrative. In other embodiments, the calibration data 26 may also indicate angle of other harmonics, relationship between angle and other power factors, relationship between angle and other modulation indices, relationships for angles when operating in the transient inverter mode, or any combination thereof.

Figure 11:
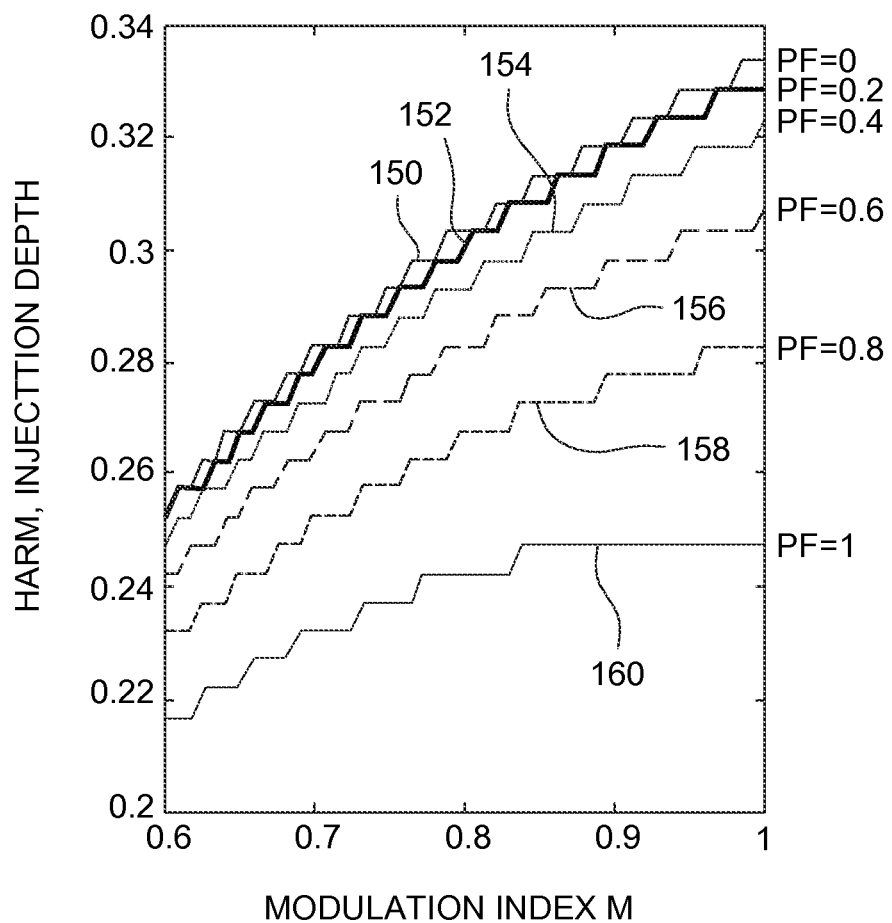
FIG. 11 is a plot representing a portion of calibration data describing a relationship between harmonic injection magnitude, modulation index, and power factor when operating in the steady-state inverter mode, in accordance with an embodiment.

To further illustrate, a representation of calibration data 26 describing magnitude (e.g., injection depth with respect to output AC current) of the second harmonic when operating in the steady-state inverter mode is described in FIG. 11. In the depicted embodiment, when the modulation index is between 0.6-1, the magnitude of the second harmonic is described using a first magnitude curve 150 when the power factor is zero, a second magnitude curve 152 when the power factor is 0.2, a third magnitude curve 154 when the power factor is 0.4, a fourth magnitude curve 156 when the power factor is 0.6, a fifth magnitude curve 158 when the power factor is 0.8, and a sixth magnitude curve 160 when the power factor is 1.

In such embodiments, the calibration data 26 may indicate the magnitude with which to inject a second harmonic in the modular multilevel converter 12 when operating in the steady-state inverter mode to reduce RMS storage component current based at least in part on modulation index and power factor of the modular multilevel converter 12. In some embodiments, the calibration data 26 may store the relationship may be stored in a look-up-table (LUT) to facilitate determining the magnitude. It should be noted that the calibration data 26 described in FIG. 11 is merely intended to illustrative. In other embodiments, the calibration data 26 may also indicate magnitude of other harmonics, relationship between magnitude and other power factors, relationship between magnitude and other modulation indices, relationships for angles when operating in the transient inverter mode, or any combination thereof.

As such, the controller 18 may determine harmonic injection parameters (e.g., angle and/or magnitude) that facilitate reducing RMS storage component current based at least in part on operational parameters of the modular multilevel converter 12 using the calibration data. The controller 18 may then instruct the modular multilevel converter 12 to inject harmonics based at least in part on the harmonic injection parameters to facilitate reducing heating produced in the storage components (e.g., ultracapacitors 44) and, thus, improving lifespan of the storage components.

Figure 12:
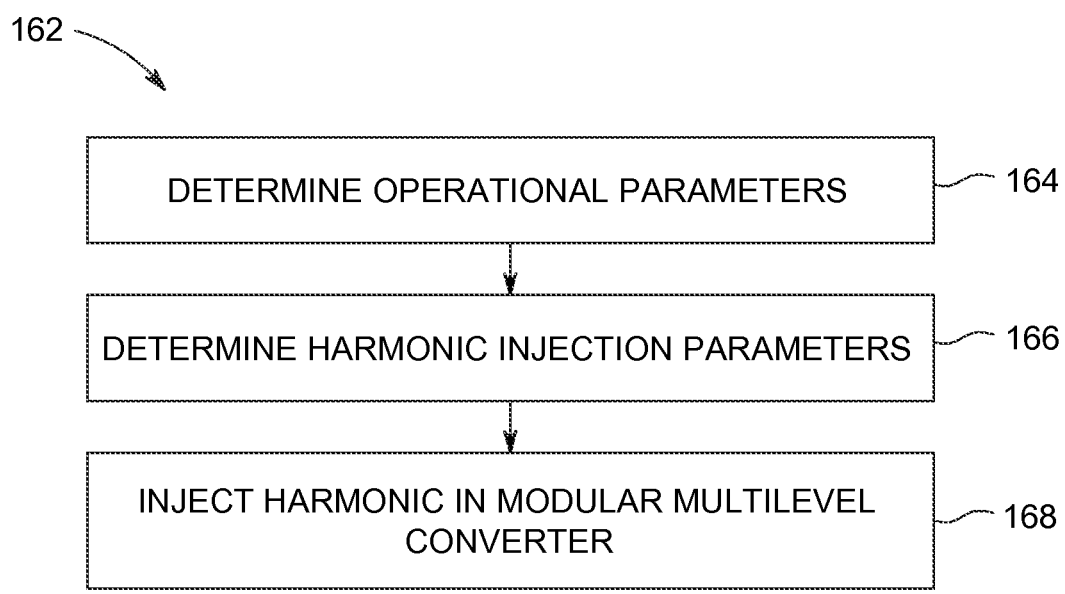
FIG. 12 is a flow diagram of a process for injecting a harmonic in a modular multilevel converter, in accordance with an embodiment.

One embodiment of a process 162 for injecting harmonics into the modular multilevel converter 12 is described in FIG. 12. Generally, the process 162 includes determining operational parameters of the modular multilevel converter 12 (process block 164), determining harmonic injection parameters (process block 166), and injecting one or more harmonics in the modular multilevel converter (process block 168). In some embodiments, the process 162 may be implemented by instructions stored in the controller memory 24 and/or other suitable tangible, non-transitory computer readable mediums that are executable by the controller processor 22 and/or other suitable processing circuitry.

Accordingly, in such embodiments, the controller 18 may determine operational parameters of the modular multilevel converter 12 (process block 164). More specifically, the controller 18 may determine some operational parameters based at least in part on measurements received from one or more sensors 20. For example, the controller 18 may receive signals indicating AC terminal current, AC terminal voltage, DC terminal current, and/or DC terminal voltage from power sensors 20 electrically coupled to the AC terminals 32, the positive DC terminal 28, and/or the negative DC terminal 30. Additionally, the controller 18 may receive signals indicating storage component voltage from power sensors 20 electrically coupled to the storage components (e.g., ultracapacitors 44). Furthermore, the controller 18 may determine power factor and/or storage component utilization based at least in part on the AC terminal current, AC terminal voltage, DC terminal current, DC terminal voltage, and/or storage component voltage.

In some embodiments, the controller 18 may also determine operational parameters based at least in part on control signals sent to the modular multilevel converter 12. For example, the controller 18 may determine the modulation index and/or operating mode based on the control signals instructing the active power link modules 38 to connect and disconnect the ultracapacitors 44.

Based on the operational parameters, the controller 18 may determine harmonic injection parameters (process block 166). In some embodiments, the controller 18 may use algorithms to calculate harmonic injection parameters that facilitate reducing RMS storage component current. Additionally or alternatively, the controller 18 may determine the harmonic injection parameters using the calibration data 26. In embodiments where the calibration data 26 is stored as one or more look-up-tables, the controller 18 may retrieve the calibration data 26 from the controller memory 24 and input the operational parameters to determine harmonic injection parameters that facilitate reducing RMS storage component current.

For example, based on the calibration data described in 10, the controller 18 may determine that the angle of a second harmonic current should be approximately zero radians when the power factor is 1, the modulation index is 1, and operating in the steady-state inverter mode. Additionally, based on the calibration data described in FIG. 11, the controller 18 may determine that the magnitude of the second harmonic should be approximately 0.24 times the output AC current when the power factor is 1, the modulation index is 1, and operating in the steady-state inverter mode. In a similar manner, the controller 18 may determine angle and magnitude of the second harmonic for other power factors and modulation index pairs when operating in the steady-state inverter mode or the transient inverter mode.

Returning to the process 162 described in FIG. 12, the controller 18 may then instruct modular multilevel converter 12 to inject harmonics (process block 168). More specifically, the controller 18 may transmit control signals instructing each active power link modules 38 to connect or disconnect their respective storage component (e.g., ultracapacitor 44) to implement the determined harmonic injection parameters. For example, the controller 18 may instruct the active power link modules 38 to operate inject a second harmonic with an angle of zero radians and a magnitude of 0.24 times the output AC current. In this manner, the RMS storage component current may be reduced to facilitate reducing heating produced in the storage components and, thus, improve life span of the storage components.

To help illustrate, operation of a modular multilevel converter 12 in the steady-state inverter mode with injection of a second harmonic is described with timing diagrams depicted in FIGS. 13A-13D. To simplify discussion, the timing diagrams relate to a single phase leg 60 that includes an upper arm 62 and a lower arm 64. Additionally, the upper arm 62 includes an upper ultracapacitor 44 and the lower arm 64 includes a lower ultracapacitor 44. One or ordinary skill in the art will easily be able to expand the described techniques to multiple phase legs 60 each with multiple ultracapacitors 44 on each arm 62 and 64.

Figure 13A:
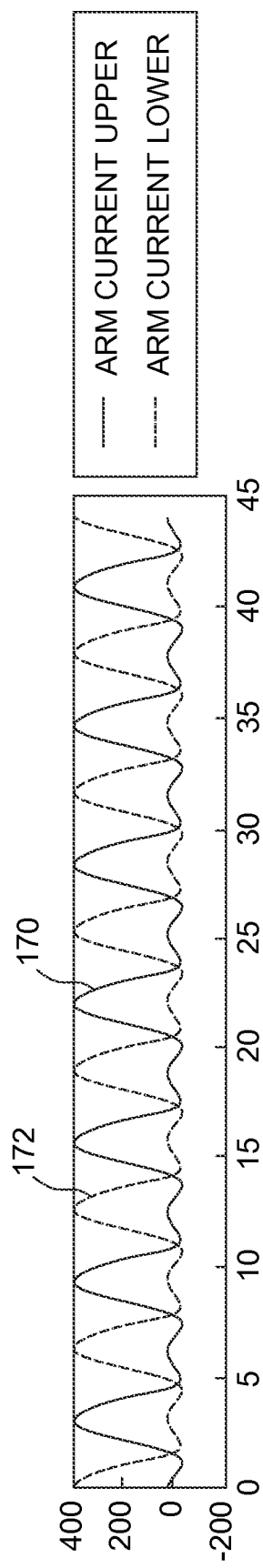
FIG. 13A is a plot of upper arm current and lower arm current when operating in the steady-state inverter mode with harmonic injection, in accordance with an embodiment.
Figure 13B:
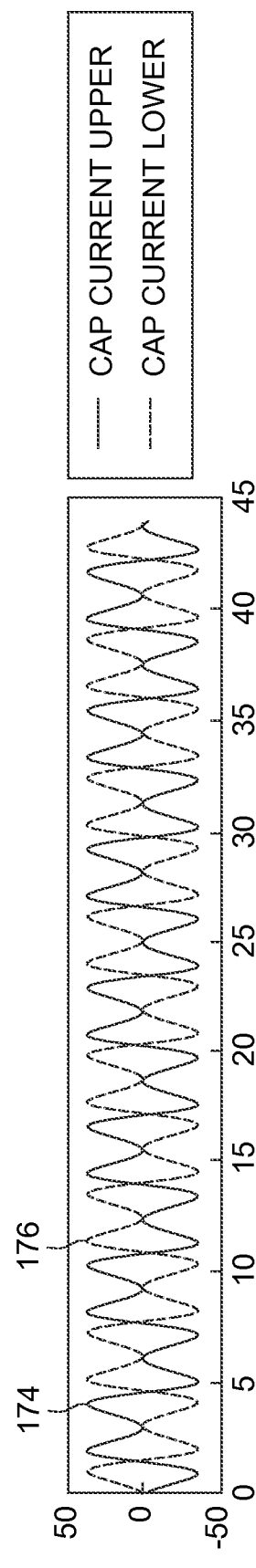
FIG. 13B is a plot of upper storage component current and lower storage component current when operating in the steady-state inverter mode with harmonic injection, in accordance with an embodiment.
Figure 13C:
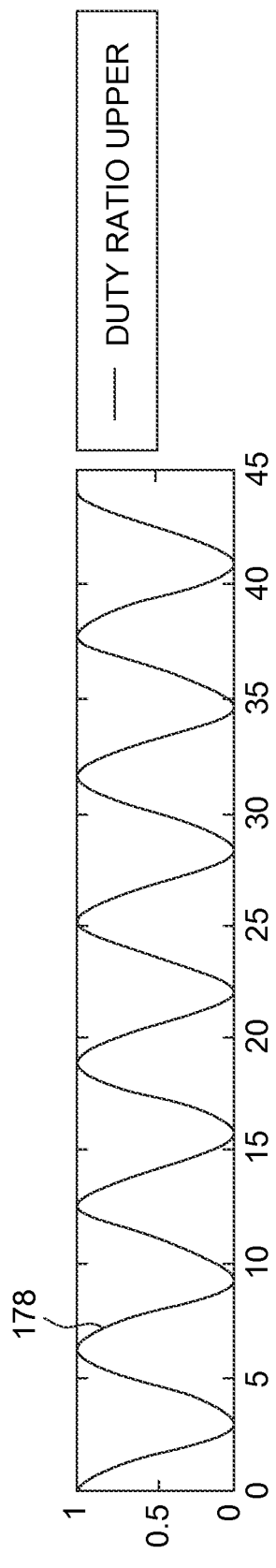
FIG. 13C is a plot of duty ratio of the power storage module of FIG. 3 when operating in the steady-state inverter mode with harmonic injection, in accordance with an embodiment.

More specifically, FIG. 13A is a timing diagram describing upper arm current 170 and lower arm current 172 over time. Additionally, FIG. 13B is a timing diagram describing upper ultracapacitor current 174 and lower ultracapacitor current 176 over time. FIG. 13C is a timing diagram describing upper ultracapacitor duty ratio 178 used to selectively connect the upper ultracapacitor 44. Furthermore, FIG. 13D is a timing diagram describing upper ultracapacitor voltage 180, lower ultracapacitor voltage 182, and leg current 184.

As described above, when operating in the steady-state inverter mode, the modular multilevel converter 12 receives DC electrical power from the DC side 14 to generate AC electrical power output via the AC electrical terminal 32. Accordingly, when one or more even harmonics are injected in steady-state inverter mode, the upper arm current 170 may be described as follows:

$$i_{uarm}(t) = I_{DC} + 1/2 I_{AC}^* \cos(x+dx) + I_{AC}(M_{h2}\cos(2x+dx2) + M_{h4}\cos(4x+dx4) + \ldots) \tag{17}$$

where $i_{uarm}$ is the upper arm current 170, t is time, $I_{DC}$ is the DC current from the DC side 14, $I_{AC}$ is the AC current supplied to the AC terminal 32, x is the base phase angle (e.g., ωt), dx is the phase shift between AC current and AC voltage at the AC terminal 32, $M_{h2}$ is the injection depth of an injected second harmonic, dx2 is the phase shift between the injected second harmonic and the AC current, $M_{h4}$ is the injection depth of an injected fourth harmonic, and dx4 is the phase shift between the injected fourth harmonic and the AC current. On the other hand, the lower arm current 172 may be defined as follows:

$$i_{larm}(t) = I_{DC} - 1/2 I_{AC} * \cos(x+dx) - I_{AC}(M_{h2}\cos(2x+dx2) + M_{h4}\cos(4x+dx4) + \ldots) \quad (18)$$

where $i_{larm}$ is the lower arm current 172, t is time, $I_{DC}$ is the DC current from the DC side 14, $I_{AC}$ is the AC current supplied to the AC terminal 32, x is the base phase angle (e.g., ωt), and dx is the phase shift between AC current and AC voltage at the AC terminal 32, $M_{h2}$ is the injection depth of an injected second harmonic, dx2 is the phase shift between the injected second harmonic and the AC current, $M_{h4}$ is the injection depth of an injected fourth harmonic, and dx4 is the phase shift between the injected fourth harmonic and the AC current.

Thus, as described in FIG. 13A, when a second harmonic is injected, the upper arm current 170 and the lower arm current 172 each includes the DC offset component, the base frequency component, and a second harmonic (e.g., two times base frequency) component. Additionally, the upper arm current 170 and the lower arm current 172 are antiphase. In the described example, the upper arm current 170 is defined such that current flows away from the positive DC terminal 28 when positive and toward the positive DC terminal 28 when negative. On the other hand, the lower arm current 172 is defined such that current flows toward the negative DC terminal 30 when positive and away from the negative DC terminal 30 when negative.

Accordingly, the upper ultracapacitor 44 may be charged when the upper arm current 170 is positive and discharged when the upper arm current 170 is negative. Thus, as described in FIG. 13B, the upper ultracapacitor current 174 is positive when the upper arm current 170 is positive, thereby charging the upper ultracapacitor, and negative when the upper arm current 170 is negative, thereby discharging the upper ultracapacitor 44. However, since the profile of the upper arm current 170 is changed by the second harmonic, the profile of the upper ultracapacitor current 170 is also changed. For example, in the depicted embodiment, the range of the upper ultracapacitor current 170 is reduced by injection of the second harmonic.

Similarly, the lower ultracapacitor 44 may be charged when the lower arm current 172 is positive and discharged when the lower arm current 172 is negative. Thus, as described in FIG. 13B, the lower ultracapacitor current 176 is positive when the lower arm current 172 is positive, thereby charging the lower ultracapacitor 44, and negative when the lower arm current 96 is negative, thereby discharging the lower ultracapacitor 44. However, since the profile of the lower arm current 172 is changed by the second harmonic, the profile of the lower ultracapacitor current 176 is also changed. For example, in the depicted embodiment, the range of the lower ultracapacitor current 176 is reduced by injection of the second harmonic.

Although the one or more even harmonics may be injected based at least in part on selectively connecting and disconnecting storage components (e.g., ultracapacitors 44), the duty ratio may remain generally the same to produce the AC electrical power. Accordingly, the duty ratio of the upper ultracapacitor 44 may be described by equation (3) and the duty ratio of the lower capacitor may be defined by equation (5). Thus, as described in FIG. 13C, the upper duty ratio 178 varies sinusoidally between 0% and 100% to facilitate producing sinusoidal AC electrical power.

As described above, the current in an ultracapacitor 44 may be the product of its duty cycle and arm current. Accordingly, the upper ultracapacitor current 174 may be described by equation (6) and the lower ultracapacitor current 176 may be defined by equation (7). Thus, when the duty ratio and the arm currents each include multiple frequency components, the upper ultracapacitor current 174 and the lower ultracapacitor current 176 also each include multiple frequency components.

To help illustrate, FIGS. 14A-14C describe the upper duty ratio 178, the upper arm current 170, and the upper ultracapacitor current 174 in the frequency domain. More specifically, FIGS. 14A-14C describe magnitude of frequency components when outputting 60 Hz base frequency AC electrical power. For example, FIG. 14A describes that the upper duty ratio 178 includes a DC (e.g., 0 Hz) component and a base frequency (e.g., 60 Hz) component. Additionally, FIG. 13B describes that the upper arm current 170 includes a DC component, a second harmonic (e.g., 120 Hz) component.

As described above, the upper ultracapacitor current 174 may be the product of the upper duty ratio 178 and the upper arm current 170. Thus, in some embodiments, the upper ultracapacitor current 98 may include a DC component, a base frequency component, and a second harmonic (e.g., 120 Hz) component. However, in the depicted embodiment, the modular multilevel converter 12 is operated such that the DC component of the upper ultracapacitor current 174 is zero.

Additionally, as described above, the root-mean-square (RMS) ultracapacitor current may be determined based on the magnitude of each frequency component of the ultracapacitor current using equation (8). Since the DC component of the ultracapacitor current is unaffected by the second harmonic, the DC component may still be described by equation (9). Additionally, in some embodiments, the DC component of the ultracapacitor current may be zero when operating in the steady-state inverter mode.

However, injection of the second harmonic may affect the base frequency component, the second harmonic component, and the third harmonic component of the ultracapacitor current. For example, as depicted in FIG. 14C, the 60 Hz component and the 120 Hz component of the ultracapacitor current are reduced by the injection of the second harmonic. In some embodiments, when operating in the steady-state inverter mode and a second harmonic is injected, the base frequency (e.g., 60 Hz) component of the ultracapacitor current may be described as follows:

$$I_1 = \frac{\sqrt{k^2(2I_{DC}M - I_{AC}\cos(dx) + I_{AC}M * M_{H2}\cos(dx2))^2 + I_{AC}^2 k^2(\sin(dx) - 2M * M_{h2}\sin(dx2))^2}}{4} \quad (19)$$

where $I_1$ is the base component of the ultracapacitor current, $I_{DC}$ is the is the DC current from the DC side 14, $I_{AC}$ is the AC current supplied to the AC terminal 32, k is the usage coefficient, M is the modulation index, dx is the phase shift between AC current and AC voltage at the AC terminal 32, $M_{h2}$ is the injection depth of an injected second harmonic, and dx2 is the phase shift between the injected second harmonic and the AC current. Additionally, the second harmonic component of the ultracapacitor current may be described as follows:

$$I_2 = \frac{\sqrt{I_{AC}^2 k^2 (M\cos(dx) - 4M_{h2}\cos(dx2))^2 + I_{AC}^2 k^2 (M\sin(dx) - 4M_{h2}\sin(dx2))^2}}{8} \quad (20)$$

where $I_2$ is the second harmonic component of the ultracapacitor current, $I_{DC}$ is the is the DC current from the DC side 14, $I_{AC}$ is the AC current supplied to the AC terminal 32, k is the usage coefficient, M is the modulation index, and dx is the phase shift between AC current and AC voltage at the AC terminal 32, $M_{h2}$ is the injection depth of an injected second harmonic, and dx2 is the phase shift between the injected second harmonic and the AC current.

On the other hand, as depicted in FIG. 14C, the magnitude of the 180 Hz component of the ultracapacitor current is increased by the injection of the second harmonic. In some embodiments, when a second harmonic is injected, the third harmonic (e.g., 120 Hz) component of the ultracapacitor current may be described as follows:

$$I_3 = \frac{I_{AC}M * M_{h2}k\cos(dx2)}{4} \qquad (21)$$

where $I_3$ is the third harmonic component of the ultracapacitor current, $I_{AC}$ is the AC current supplied to the AC terminal 32, k is the usage coefficient, M is the modulation index, $M_{h2}$ is the injection depth of an injected second harmonic, and dx2 is the phase shift between the injected second harmonic and the AC current.

Nevertheless, the reduction of magnitude of the other frequency components may still facilitate an overall reduction in RMS storage component current. To help illustrate, FIG. 15 describes a first RMS storage component current curve 186 and a second RMS storage component current curve 188. More specifically, the first RMS storage component curve 186 describes RMS storage component current for modulation indices between 0.6-1 when operating in the steady-state inverter mode without harmonic injection. On the other hand, the second RMS storage component curve 188 describes RMS storage component current for modulation indices between 0.6-1 when operating in the steady-state inverter mode and a second harmonic is injected based on the calibration data 26 described in FIGS. 10 and 11.

Figure 15:
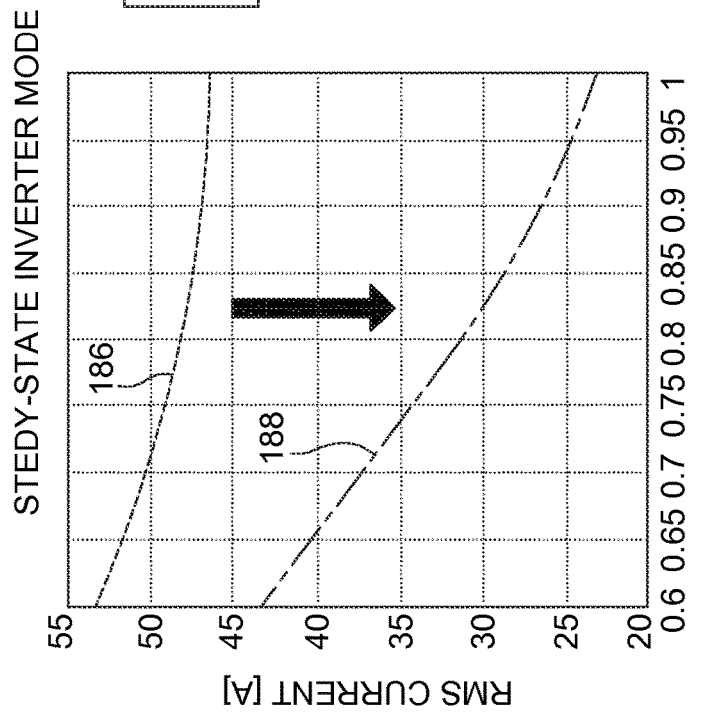
FIG. 15 is a plot of root-mean-square storage component current with harmonic injection and without harmonic injection when operating in the steady-state inverter mode, in accordance with an embodiment.

As depicted in FIG. 15, by injecting a second harmonic in the modular multilevel converter 12, the RMS storage component current is reduced for each modulation indices between 0.6-1. In fact, the RMS storage component current may be reduced as the modulation is increases. Accordingly, when operating in the steady-state inverter mode, injecting a second harmonic with harmonic injection parameters from the calibration data 26 may facilitate reducing heating produced in storage components (e.g., ultracapacitors 44) of the modular multilevel converter and, thus, facilitate improving life span of the storage components.

In addition to the steady-state inverter mode, the RMS storage component current may be reduced when operating in the transient inverter mode by injection of one or more even harmonics. To help illustrate, FIGS. 16A-16D are timing diagrams describing operation of a modular multilevel converter 12 when a second harmonic is injected. To simplify discussion, the timing diagrams relate to a single phase leg 60 that includes an upper arm 62 and a lower arm 64. Additionally, the upper arm 62 includes an upper ultracapacitor 44 and the lower arm 64 includes a lower ultracapacitor 44. One or ordinary skill in the art will easily be able to expand the described techniques to multiple phase legs 60 each with multiple ultracapacitors 44 on each arm 62 and 64.

Figure 16A:
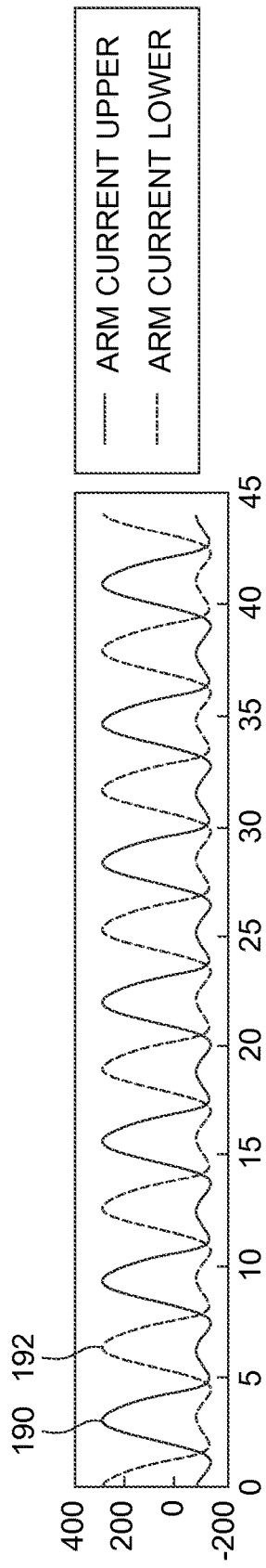
FIG. 16A is a plot of upper arm current and lower arm current when operating in the transient inverter mode with harmonic injection, in accordance with an embodiment.
Figure 16B:
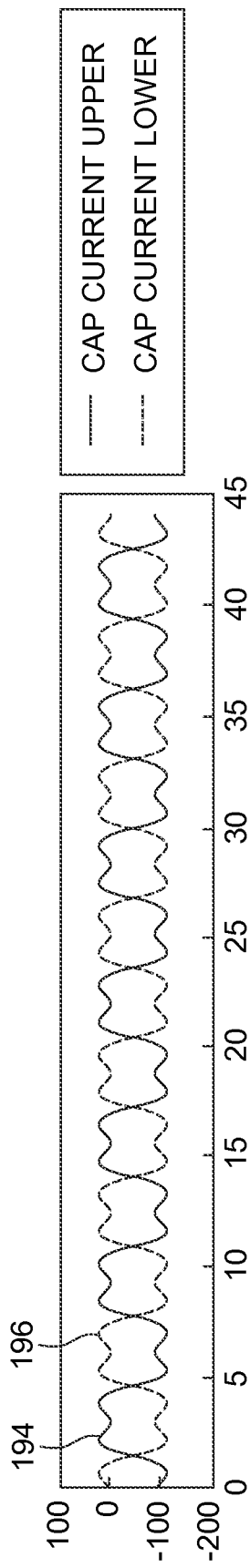
FIG. 16B is a plot of upper storage component current and lower storage component current when operating in the transient inverter mode with harmonic injection, in accordance with an embodiment.
Figure 16C:
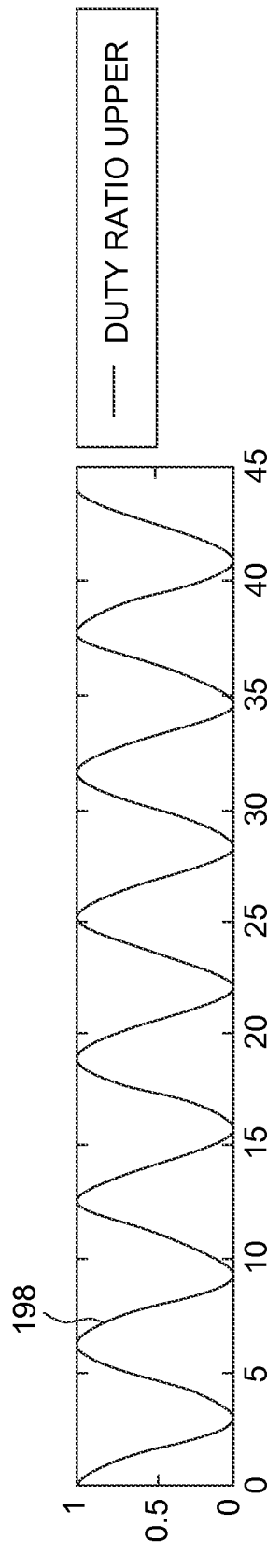
FIG. 16C is a plot of duty ratio of the power storage module of FIG. 3 when operating in the transient inverter mode with harmonic injection, in accordance with an embodiment.
Figure 16D:
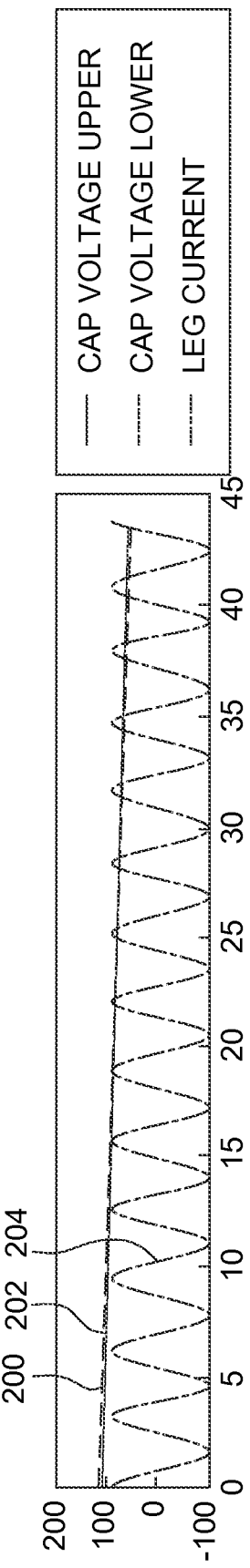
FIG. 16D is a plot of branch current and upper storage component voltage and lower storage component voltage when operating in the transient inverter mode with harmonic injection, in accordance with an embodiment.

More specifically, FIG. 16A is a timing diagram describing upper arm 190 and lower arm current 192 over time. Additionally, FIG. 16B is a timing diagram describing upper ultracapacitor current 194 and lower ultracapacitor current 196 over time. FIG. 16C is a timing diagram describing upper ultracapacitor duty ratio 196 used to selectively connect the upper ultracapacitor 44. Furthermore, FIG. 16D is a timing diagram describing upper ultracapacitor voltage 200, lower ultracapacitor voltage 202, and phase leg current 204.

As described above, when operating in the transient inverter mode, the DC side 14 is bypassed. Instead, the modular multilevel converter 12 generates AC electrical power output via the AC electrical terminal 32 using electrical energy stored in the storage components (e.g., ultracapacitors 44). Accordingly, when one or more even harmonics are injected in transient inverter mode, the upper arm current 190 may be described as follows:

$$i_{uarm}(t) = 1/2I_{AC}*\cos(x+dx) + I_{AC}(M_{h2}\cos(2x+dx2) + M_{h4}\cos(4x+dx4) + \ldots) \qquad (22)$$

where $i_{uarm}$ is the upper arm current 170, t is time, $I_{AC}$ is the AC current supplied to the AC terminal 32, x is the base phase angle (e.g., ωt), dx is the phase shift between AC current and AC voltage at the AC terminal 32, $M_{h2}$ is the injection depth of an injected second harmonic, dx2 is the phase shift between the injected second harmonic and the AC current, $M_{h4}$ is the injection depth of an injected fourth harmonic, and dx4 is the phase shift between the injected fourth harmonic and the AC current. On the other hand, the lower arm current 192 may be described as follows:

$$i_{larm}(t) = -1/2I_{AC}*\cos(x+dx) - I_{AC}(M_{h2}\cos(2x+dx2) + M_{h4}\cos(4x+dx4) + \ldots) \qquad (23)$$

where $i_{larm}$ is the lower arm current 172, t is time, $I_{AC}$ is the AC current supplied to the AC terminal 32, x is the base phase angle (e.g., ωt), and dx is the phase shift between AC current and AC voltage at the AC terminal 32, $M_{h2}$ is the injection depth of an injected second harmonic, dx2 is the phase shift between the injected second harmonic and the AC current, $M_{h4}$ is the injection depth of an injected fourth harmonic, and dx4 is the phase shift between the injected fourth harmonic and the AC current.

Thus, as described in FIG. 16A, when a second harmonic is injected, the upper arm current 190 and the lower arm current 192 each includes the base frequency component and a second harmonic (e.g., twice the base frequency) component. Additionally, the upper arm current 190 and the lower arm current 192 are antiphase. In the described example, the upper arm current 190 is defined such that current flows away from the positive DC terminal 28 when positive and toward the positive DC terminal 28 when negative. On the other hand, the lower arm current 192 is defined such that current flows toward the negative DC terminal 30 when positive and away from the negative DC terminal 30 when negative.

Accordingly, the upper ultracapacitor 44 may be charged when the upper arm current 190 is positive and discharged when the upper arm current 190 is negative. Thus, as described in FIG. 16B, the upper ultracapacitor current 194 is positive when the upper arm current 190 is positive, thereby charging the upper ultracapacitor, and negative when the upper arm current 190 is negative, thereby discharging the upper ultracapacitor 44. However, since the profile of the upper arm current 190 is changed by the second harmonic, the profile of the upper ultracapacitor current 194 is also changed. For example, in the depicted embodiment, the range of the upper ultracapacitor current 194 is reduced by injection of the second harmonic.

Similarly, the lower ultracapacitor 44 may be charged when the lower arm current 192 is positive and discharged when the lower arm current 192 is negative. Thus, as described in FIG. 16B, the lower ultracapacitor current 196 is positive when the lower arm current 172 is positive, thereby charging the lower ultracapacitor 44, and negative when the lower arm current 192 is negative, thereby discharging the lower ultracapacitor 44. However, since the profile of the lower arm current 192 is changed by the second harmonic, the profile of the lower ultracapacitor current 196 is also changed. For example, in the depicted embodiment, the range of the lower ultracapacitor current 176 is reduced by injection of the second harmonic.

Although the one or more even harmonics may be injected based at least in part on selectively connecting and disconnecting storage components (e.g., ultracapacitors 44), the duty ratio may remain generally the same to produce the AC electrical power. Accordingly, the duty ratio of the upper ultracapacitor 44 may be described by equation (3) and the duty ratio of the lower capacitor may be defined by equation (5). Thus, as described in FIG. 13C, the upper duty ratio 198 varies sinusoidally between 0% and 100% to facilitate producing sinusoidal AC electrical power.

As described above, the current in an ultracapacitor 44 may be the product of its duty cycle and arm current. Accordingly, the upper ultracapacitor current 194 may be defined by equation (6) and the lower ultracapacitor current 196 may be defined by equation (7). Thus, when the duty ratio and the arm currents each include multiple frequency components, the upper ultracapacitor current 194 and the lower ultracapacitor current 196 also each include multiple frequency components.

To help illustrate, FIGS. 17A-17C describe the upper duty ratio 198, the upper arm current 190, and the upper ultracapacitor current 194 in the frequency domain. More specifically, FIGS. 17A-17C describe magnitude of frequency components when outputting 60 Hz base frequency AC electrical power. For example, FIG. 17A describes that the upper duty ratio 198 includes a DC (e.g., 0 Hz) component and a base frequency (e.g., 60 Hz) component. Additionally, FIG. 17B describes that the upper arm current 190 includes a DC component, a base frequency component, and a second harmonic (e.g., 120 Hz) component.

As described above, the upper ultracapacitor current 194 may be the product of the upper duty ratio 198 and the upper arm current 190. Thus, as depicted in FIG. 17C, the upper ultracapacitor current 194 includes a DC component, a base frequency component, a second harmonic (e.g., 120 Hz) component, and a third harmonic (e.g., 180 Hz) component.

Additionally, as described above, the root-mean-square (RMS) ultracapacitor current may be determined based on the magnitude of each frequency component of the ultracapacitor current using equation (8). Since the DC component of the ultracapacitor current is unaffected by the second harmonic, the DC component may still be described by equation (9).

However, injection of the second harmonic may affect the base frequency component, the second harmonic component, and the third harmonic component. For example, as depicted in FIG. 17C, the 60 Hz component and the 120 Hz component of the ultracapacitor current are reduced by the injection of the second harmonic. In some embodiments, when operating in the transient inverter mode and a second harmonic is injected, the base frequency (e.g., 60 Hz) component of the ultracapacitor current may be described as follows:

$$I_1 = \frac{\sqrt{k^2(-I_{AC}\cos(dx) + I_{AC}M*M_{h2}\cos(dx2))^2 + I_{AC}^2 k^2(\sin(dx) - 2M*M_{h2}\sin(dx2))^2}}{4} \quad (24)$$

where $I_1$ is the base component of the ultracapacitor current, $I_{AC}$ is the AC current supplied to the AC terminal 32, k is the usage coefficient, M is the modulation index, dx is the phase shift between AC current and AC voltage at the AC terminal 32, $M_{h2}$ is the injection depth of an injected second harmonic, and dx2 is the phase shift between the injected second harmonic and the AC current.

Additionally, the second harmonic component of the ultracapacitor current may be described by equation (20). On the other hand, as depicted in FIG. 17C, the magnitude of the 120 Hz component of the upper ultracapacitor current is decreased by the injection of the second harmonic. In some embodiments, the third harmonic (e.g., 180 Hz) component of the ultracapacitor current may be described by equation (21).

Nevertheless, the reduction of magnitude of the other frequency components may still facilitate an overall reduction in RMS storage component current. To help illustrate, FIG. 18 describes a first RMS storage component current curve 206 and a second RMS storage component current curve 208. More specifically, the first RMS storage component curve 206 describes RMS storage component current for modulation indices between 0.6-1 when operating in the transient inverter mode without harmonic injection. On the other hand, the second RMS storage component curve 208 describes RMS storage component current for modulation indices between 0.6-1 when operating in the transient inverter mode and a second harmonic is injected based on the calibration data 26 described in FIGS. 10 and 11.

Figure 18:
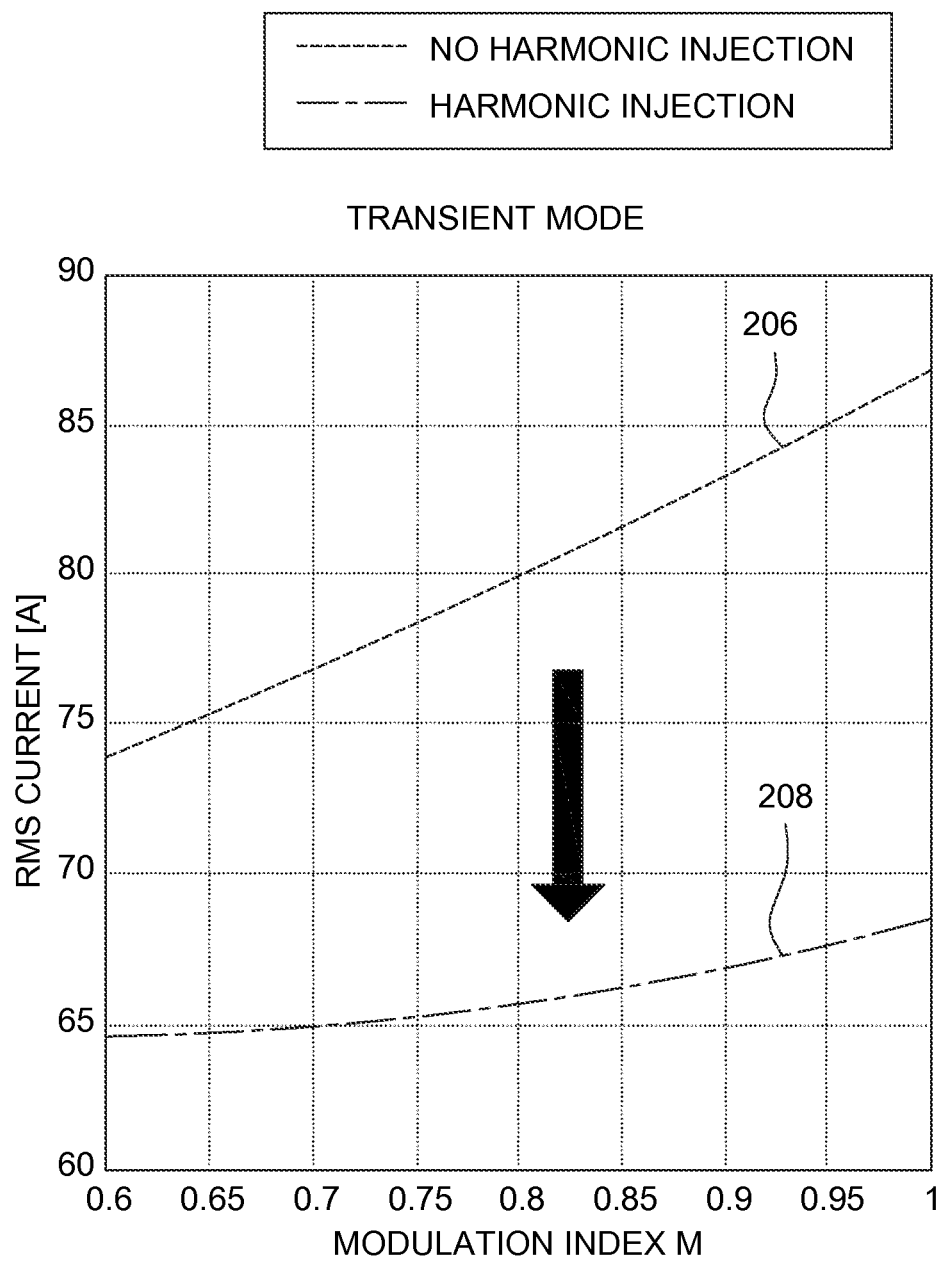
FIG. 18 is a plot of root-mean-square storage component current with harmonic injection and without harmonic injection when operating in the transient inverter mode, in accordance with an embodiment.

As depicted in FIG. 18, by injecting a second harmonic in the modular multilevel converter 12, the RMS storage component current is reduced for each modulation indices between 0.6-1. However, since electrical energy stored in the storage components (e.g., ultracapacitors 44) is used to produce AC electrical power, the RMS storage component current may increase as the modulation index increases. Nevertheless, as depicted, injection of the second harmonic may reduce magnitude of the increase in the RMS storage component current. Accordingly, when operating in the transient inverter mode, injecting a second harmonic with harmonic injection parameters from the calibration data 26 may also facilitate reducing heating produced in storage components (e.g., ultracapacitors 44) of the modular multilevel converter and, thus, facilitate improving life span of the storage components.

As such, technical effects of the present disclosure include enabling use of current sensitive storage components, such as ultracapacitors, in a modular multilevel converter. More specifically, one or more even order harmonics may be injected into each leg of the modular multilevel converter to reduce RMS current conducted by the storage components. Since heating produced in the storage components may be quadratically proportional to RMS current, injecting the one or more even order harmonics may facilitate reducing temperature of the storage components and, thus, improve life span of the storage components. In this manner, the modular multilevel converter may utilize storage components (e.g., ultracapacitors) that enable the modular multilevel converter to serve as a buffer between a DC side and an AC side and, thus, reduce harmonic current drawn from DC side by temporarily bypassing the DC side This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A modular multilevel converter comprising:
a first upper arm comprising a first active power link module, wherein the first active power link module is configured to selectively connect and disconnect a first ultracapacitor to the first upper arm to facilitate:
producing a first portion of a first alternating current electrical power at a base frequency; and
injecting a first even-order current harmonic of the base frequency in the first upper arm;
a first lower arm comprising a second active power link module, wherein the second active power link module is configured to selectively connect and disconnect a second ultracapacitor to the first lower arm to facilitate:
producing a second portion of the first alternating current, wherein the first portion of the first alternating current and the second portion of the alternating current are combined to facilitate outputting the first alternating current electrical power at a first alternating current terminal; and
injecting the first even-order current harmonic in the first lower arm, wherein magnitude of the first even-order current harmonic is zero at the first alternating current terminal;
wherein the first even-order current harmonic is configured to reduce root-mean-square current flowing in the first ultracapacitor and root-mean square of current flowing the second ultracapacitor when the modular multilevel converter is in operation;
wherein the base frequency is 60 Hz and a second harmonic frequency is 120 Hz;
wherein the first portion of the first alternating current comprises a first direct current component and a first alternating current component at the base frequency of 60 Hz;
wherein the first even-order current harmonic comprises second alternating current component at the second harmonic frequency of 120 Hz; and
wherein current conducted by the first ultracapacitor comprises a 60 Hz component, a 120 Hz component, and a 180 Hz component.

2. The modular multilevel converter of claim 1, comprising a positive direct current terminal and a negative direct current terminal configured to electrically couple the modular multilevel converter to a direct current side;
wherein the first alternating current terminal is configured to electrically couple the modular multilevel converter to an alternating current side; and
wherein the modular multilevel converter is configured to bypass the direct current side when outputting the first alternating current electrical power by producing the first portion of the first alternating current electrical power and the second portion of the first alternating electrical power using only electrical energy stored in the first ultracapacitor and the second ultracapacitor.

3. The modular multilevel converter of claim 1, wherein:
the first active power link module and the second active power link modular are configured to selectively connect and disconnect the first ultracapacitor and the second ultracapacitor based on control signals received from a controller, wherein the control signals indicate harmonic injection parameters of the first even-order current harmonic; and
the controller is configured to determine the harmonic injection parameters based at least in part on operational parameters of the modular multilevel converter.

4. The modular multilevel converter of claim 3, wherein:
the harmonic injection parameters comprise a magnitude and an angle of the first even-order current harmonic with respect to the first alternating current electrical power; and
the operational parameters comprise an operating mode, a power factor, modulation index, a usage coefficient of the modular multilevel converter, or any combination thereof, wherein the operating mode comprises a transient inverter mode and a steady-state inverter mode.

5. The modular multilevel converter of claim 1, comprising:
a second upper arm comprising a third active power link module, wherein the third active power link module is configured to selectively connect and disconnect a third ultracapacitor to the second upper arm to facilitate:
producing a first portion of a second alternating current electrical power at the base frequency; and
injecting a second even-order current harmonic of the base frequency in the second upper arm;
a second lower arm comprising a fourth active power link module, wherein the fourth active power link module is configured to selectively connect and disconnect a fourth ultracapacitor to the second lower arm to facilitate:
producing a second portion of the second alternating current electrical power, wherein the first portion of the second alternating current electrical power and the second portion of the second alternating current electrical power are combined to facilitate outputting the second alternating current at a second alternating current terminal; and
injecting the second even-order current harmonic in the second lower arm, wherein magnitude of the second even-order current harmonic is zero at the second alternating current terminal.

6. The modular multilevel converter of claim 5, wherein:
the modular multilevel converter is configured to output single phase alternating current electrical power; and
the first even-order current harmonic and the second even-order current harmonic are equal in magnitude, equal in frequency, and 180° out of phase.

7. The modular multilevel converter of claim 5, comprising:
a third upper arm comprising a fifth active power link module, wherein the fifth active power link module is configured to selectively connect and disconnect a fifth ultracapacitor to the third upper arm to facilitate:
producing a first portion of a third alternating current electrical power at the base frequency; and
injecting a third even-order current harmonic of the base frequency in the third upper arm;
a third lower arm comprising a sixth active power link module, wherein the sixth active power link module is configured to selectively connect and disconnect a sixth ultracapacitor to the third lower arm to facilitate:
producing a second portion of the third alternating current electrical power, wherein the first portion of the third alternating current electrical power and the second portion of the third alternating current electrical power are combined to facilitate outputting the third alternating current at a third alternating current terminal; and
injecting the third even-order current harmonic in the third lower arm, wherein magnitude of the third even-order harmonic current is zero at the third alternating current terminal.

8. The modular multilevel converter of claim 7, wherein:
the modular multilevel converter is configured to output three phase alternating current electrical power; and
the first even-order current harmonic, the second even-order current harmonic, and the third even-order current harmonic are equal in magnitude and frequency and 120° out of phase from one another.

9. The modular multilevel converter of claim 1, wherein:
frequency of the first even-order current harmonic is twice frequency of the base frequency;
the first active power link module is configured to selectively connect and disconnect the first ultracapacitor to the first upper arm to facilitate injecting a second even-order current harmonic of the base frequency in the first upper arm;
the second active power link module is configured to selectively connect and disconnect the second ultracapacitor to the first lower arm to facilitate injecting the second-even order current harmonic in the first lower arm; and
frequency of the second even-order current harmonic is four times frequency of the base frequency.

10. The modular multilevel converter of claim 1, wherein:
the first upper arm comprises additional active power link modules, wherein the additional active power link modules are configured to selectively connect and disconnect their ultracapacitors to the first upper arm to facilitate:
producing the first portion of the first alternating current electrical power in the first upper arm; and
injecting the first even-order current harmonic in the first upper arm.

11. A power system, comprising:
a modular multilevel converter electrically coupled between a direct current side and an alternating current side, wherein the modular multilevel converter is configured to output alternating current electrical power at a base frequency to the alternating current side; and
a controller communicatively coupled to the modular multilevel converter, wherein the controller is configured to:
instruct the modular multilevel converter to selectively connect and disconnect one or more storage components to produce the alternating current electrical power;
determine operational parameters of the modular multilevel converter;
determine harmonic injection parameters based at least in part on the operational parameters; and
instruct the modular multilevel converter to inject one or more even order harmonics of the base frequency into legs of the multilevel converter based at least in part on the harmonic injection parameters such that the one or more even order harmonics reduce root-mean square of current conducted by the one or more storage components; and
wherein the base frequency is 60 Hz and a second harmonic frequency is 120 Hz;
wherein the first portion of the first alternating current comprises a first direct current component and a first alternating current component at the base frequency of 60 Hz;
wherein the first even-order current harmonic comprises a second alternating current component at the second harmonic frequency of 120 Hz; and
wherein current conducted by the first ultracapacitor comprises a 60 Hz component, a 120 Hz component, and a 180 Hz component.

12. The power system of claim 11, wherein the controller is configured to instruct the modular multilevel converter to inject the one or more even order harmonics to control temperature of the one or more storage components.

13. The power system of claim 11, wherein the controller is configured to:
determine amount of electrical energy stored in the one or more storage components;
instruct the modular multilevel converter to operate in a steady-state inverter mode such that the modular multilevel converter produces the alternating current electrical power by drawing direct current electrical power from the direct current side when the amount of electrical energy stored is less than a threshold; and
instruct the modular multilevel converter to operate in a transient inverter mode such that the modular multilevel converter bypasses the direct current side and produces the alternating current electrical power using only the electrical energy stored in the one or more storage components when the amount of electrical energy stored is not less than the threshold.

14. The power system of claim 11, wherein in the controller is configured to instruct the modular multilevel converter to charge the one or more storage components using electrical energy supplied from the direct current side.

15. The power system of claim 11, wherein:
the one or more storage components comprise one or more ultracapacitors; and
the one or more even harmonics comprises a second order current harmonic at twice the base frequency.

16. The power system of claim 11, wherein the power system comprises a high voltage direct current system, a high voltage alternating current system, a medium voltage direct current system, a medium voltage alternative current system, or any combination thereof.

17. A tangible, non-transitory, computer-readable medium configured to store instructions executable by a processor of a controller, wherein the instructions comprise instructions to:
instruct, using the processor, a modular multilevel converter to output alternating current electrical power at a base frequency by selectively connecting and disconnecting a plurality of storage components that store electrical energy to legs of the modular multilevel converter;
determine, using the processor, operational parameters of the modular multilevel converter based at least in part on sensor measurements and control signals transmitted to the modular multilevel converter from the controller;
determine, using the processor, harmonic injection parameters based at least in part on the operational parameters and calibration data, wherein the calibration data describes a relationship between the operational parameters and a set of parameters with which to inject an even order harmonic of the base frequency in legs of the modular multilevel converter to reduce root-mean square of current conducted by each of the plurality of storage components; and instruct, using the processor, the modular multilevel converter to inject the even order harmonic based at least in part on the harmonic injection parameters; and wherein the base frequency is 60 Hz and a second harmonic frequency is 120 Hz;

wherein the first portion of the first alternating current comprises a first direct current component and a first alternating current component at the base frequency of 60 Hz;

wherein the first even-order current harmonic comprises a second alternating current component at the second harmonic frequency of 120 Hz; and wherein current conducted by the first ultracapacitor comprises a 60 Hz component, a 120 Hz component, and a 180 Hz component.

18. The computer-readable medium of claim 17, comprising instructions to:

determine, using the processor, amount of electrical energy stored in the plurality of storage components;

instruct, using the processor, the modular multilevel converter to produce the alternating current electrical power by drawing direct current electrical power from a direct current side when the amount of electrical energy stored is less than a threshold; and instruct, using the processor, the modular multilevel converter to bypass the direct current side and produce the alternating current electrical power using only the electrical energy stored in the plurality storage components when the amount of electrical energy stored is not less than the threshold.

19. The computer-readable medium of claim 17, wherein:

the plurality of storage components comprise a plurality of ultracapacitors;

the even order harmonic comprises a second order harmonic at twice the base frequency;

the sensor measurements comprise a voltage at an alternating current terminal of the modular multilevel converter, a voltage at the alternating current terminal, current at a positive direct current terminal of the modular multilevel converter, voltage at the positive direct current terminal, current at a negative direct current terminal of the modular multilevel converter, voltage at the negative direct current terminal, or any combination thereof;

the harmonic injection parameters comprise a magnitude and an angle of the even order harmonic with respect to the first alternating current electrical power; and the operational parameters comprise a power factor, a modular index, a usage coefficient, and an operating mode of the modular multilevel converter, wherein the operating mode comprises a transient inverter mode and a steady-state inverter mode.

* * * * *